(12) United States Patent
Zeng et al.

(10) Patent No.: US 11,511,354 B2
(45) Date of Patent: Nov. 29, 2022

(54) LOCKING CHUCK WITH ANTI-VIBRATION FEATURE

(71) Applicants: APEX BRANDS, INC., Apex, NC (US); Jacobs Chuck Manufacturing (Suzhou) Company, LTD., Jiangsu (CN)

(72) Inventors: Tingwei Zeng, Jiangsu (CN); Jichun Zhou, Jiangsu (CN); Weiwei Sun, Jiangsu (CN); Huangsheng Xu, Jiangsu (CN)

(73) Assignees: APEX BRANDS, INC., Apex, NC (US); JACOBS CHUCK MANUFACTURING (SUZHOU) COMPANY, LTD., Jiangsu (CN)

( * ) Notice: Subject to any disclaimer, the term of this patent is extended or adjusted under 35 U.S.C. 154(b) by 142 days.

(21) Appl. No.: 16/634,322

(22) PCT Filed: Jul. 28, 2017

(86) PCT No.: PCT/CN2017/094947
§ 371 (c)(1),
(2) Date: Jan. 27, 2020

(87) PCT Pub. No.: WO2019/019165
PCT Pub. Date: Jan. 31, 2019

(65) Prior Publication Data
US 2020/0230712 A1 Jul. 23, 2020

(51) Int. Cl.
*B23B 31/12* (2006.01)

(52) U.S. Cl.
CPC ........ *B23B 31/123* (2013.01); *B23B 31/1238* (2013.01); *B23B 2231/38* (2013.01)

(58) Field of Classification Search
CPC .............. B23B 31/123; B23B 2231/38; B23B 31/1238; B23B 31/1207; B23B 2226/33
(Continued)

(56) References Cited

U.S. PATENT DOCUMENTS 5,044,643 A * 9/1991 Nakamura .......... B23B 31/1238
279/60
5,322,303 A * 6/1994 Nakamura .......... B23B 31/1238
279/62

(Continued)

FOREIGN PATENT DOCUMENTS

CA 2227596 A1 2/1997
CN 1494970 A 5/2004
(Continued)

OTHER PUBLICATIONS

International Search Report, PCT application No. PCT/CN2017/094947, filed on Jul. 28, 2017, all enclosed pages cited in its entirety.

*Primary Examiner* — Eric A. Gates
*Assistant Examiner* — Paul M Janeski
(74) *Attorney, Agent, or Firm* — Burr & Forman LLP

(57) ABSTRACT

A chuck (600) for use with a powered driver having a rotatable drive shaft is provided. The chuck may include a body, a plurality of movable jaws (610), a nut (625), a sleeve (640), and an anti-vibration assembly (620). The anti-vibration assembly may be operably disposed between the sleeve and the nut and configured to absorb vibration caused by operation of the power driver and maintain a position of the sleeve relative to the nut when the sleeve is in at least a locked position.

7 Claims, 24 Drawing Sheets

(58) Field of Classification Search
USPC .................................................. 279/60–65
See application file for complete search history.

(56) References Cited

U.S. PATENT DOCUMENTS

| | | | |
|---|---|---|---|
| 5,615,899 A | 4/1997 | Sakamaki | |
| 5,934,689 A | 8/1999 | Montjoy | |
| 6,260,856 B1 | 7/2001 | Temple-Wilson | |
| 6,390,481 B1 | 5/2002 | Nakamuro | |
| 6,902,172 B2 | 6/2005 | Rohm | |
| 7,708,288 B2* | 5/2010 | Bordeianu | B23B 31/1238 279/62 |
| 7,900,937 B2 | 3/2011 | Yaksich | |
| 2004/0032095 A1* | 2/2004 | Rohm | B23B 31/123 279/62 |
| 2005/0230926 A1* | 10/2005 | Sakamaki | B23B 31/1238 279/62 |
| 2006/0027979 A1 | 2/2006 | Yang | |
| 2012/0007322 A1* | 1/2012 | Sakamaki | B23B 31/1238 279/61 |
| 2012/0126495 A1 | 5/2012 | Garber et al. | |
| 2013/0277923 A1* | 10/2013 | Campbell | B23B 31/1207 279/126 |
| 2014/0077463 A1 | 3/2014 | Mason et al. | |

FOREIGN PATENT DOCUMENTS

| | | |
|---|---|---|
| CN | 1903514 A | 1/2007 |
| CN | 200957459 Y | 10/2007 |
| CN | 101829799 A | 9/2010 |
| GB | 2361201 A | 10/2001 |
| GB | 2429668 A | 3/2007 |
| GB | 2451930 A | 2/2009 |
| GB | 2426944 B | 9/2010 |
| WO | 9814294 A1 | 4/1998 |
| WO | 0245890 A2 | 6/2002 |
| WO | 2006125146 A2 | 11/2006 |

\* cited by examiner

LOCKING CHUCK WITH ANTI-VIBRATION FEATURE

TECHNICAL FIELD

Example embodiments generally relate to chucks for use with drills or with electric or pneumatic power drivers, and more particularly, relate to a chuck of the keyless type, which may be tightened or loosened by hand or actuation of the driver motor.

BACKGROUND

Both hand and electric or pneumatic tool drivers are well known. Although twist drills are common tools on such drivers, other common tools include screw drivers, nut drivers, burrs, mounted grinding stones, and other cutting or abrading tools. Each tool may include a tool shank to operably couple the tool to the driver. Since the tool shanks may be of varying diameters and cross section shapes (e.g., polygonal), a driver is often provided with a chuck adjustable over a relatively wide range. The chuck may be attached to a driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws which are moveable in the passageways to grip a cylindrical or polygonal tool shank disposed approximately along the chuck center axis. The chuck includes a nut that rotates about the chuck center and that engages threads on the jaws so that rotation of the nut moves the jaws in either direction along the center lines within the passageways. A body of the chuck is attached onto the drive shaft of a driver and is fixed relative the driver. The nut is configured to rotate relative to the body when the driver is turned. The body may be configured so that rotation of the body in one direction with respect to the nut forces the jaws into gripping relationship with the tool shank, while rotation in the opposite direction releases the gripping relationship. Chucks may be keyless if the nut can be tightened and loosened by hand. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

SUMMARY OF SOME EXAMPLES

According to some example embodiments, an example chuck for use with a powered driver having a rotatable drive shaft is provided. The example chuck may comprise a body having a nose section and a tail section. The tail section may be configured to rotate with the drive shaft and the nose section may have an axial bore formed therein and a plurality of passageways formed therethrough and intersecting the axial bore. The example chuck may further comprise a plurality of jaws movably disposed in the passageways, and a nut rotatably mounted about the body and operably coupled with the jaws such that rotation of the nut in a closing direction moves the jaws toward an axis of the axial bore and rotation of the nut in an opening direction moves the jaws away from the axis. The example chuck may further comprise a sleeve rotatably mounted about the body. The sleeve may be operably coupled to the nut such that the sleeve selectively rotates the nut. The sleeve may be configured to rotate relative to the nut when transitioning between a locked position and an unlocked position. The example chuck may further comprise an anti-vibration assembly operably disposed between the sleeve and the nut. The anti-vibration assembly may be configured to absorb vibration caused by operation of the power driver.

Another example embodiment may be a chuck for use with a powered driver having a rotatable drive shaft. The example chuck may comprise a plurality of moveable jaws and a nut operably coupled with the jaws such that rotation of the nut in a closing direction moves the jaws toward an axis of rotation of the nut and rotation of the nut in an opening direction moves the jaws away from the axis. The example chuck may further comprise a sleeve operably coupled to the nut such that the sleeve selectively rotates the nut. The sleeve may be configured to rotate relative to the nut when transitioning between a locked position and an unlocked position. The anti-vibration assembly may be operably disposed between the sleeve and the nut and configured to absorb vibration caused by operation of the power driver.

BRIEF DESCRIPTION OF THE DRAWINGS

Figure 1:
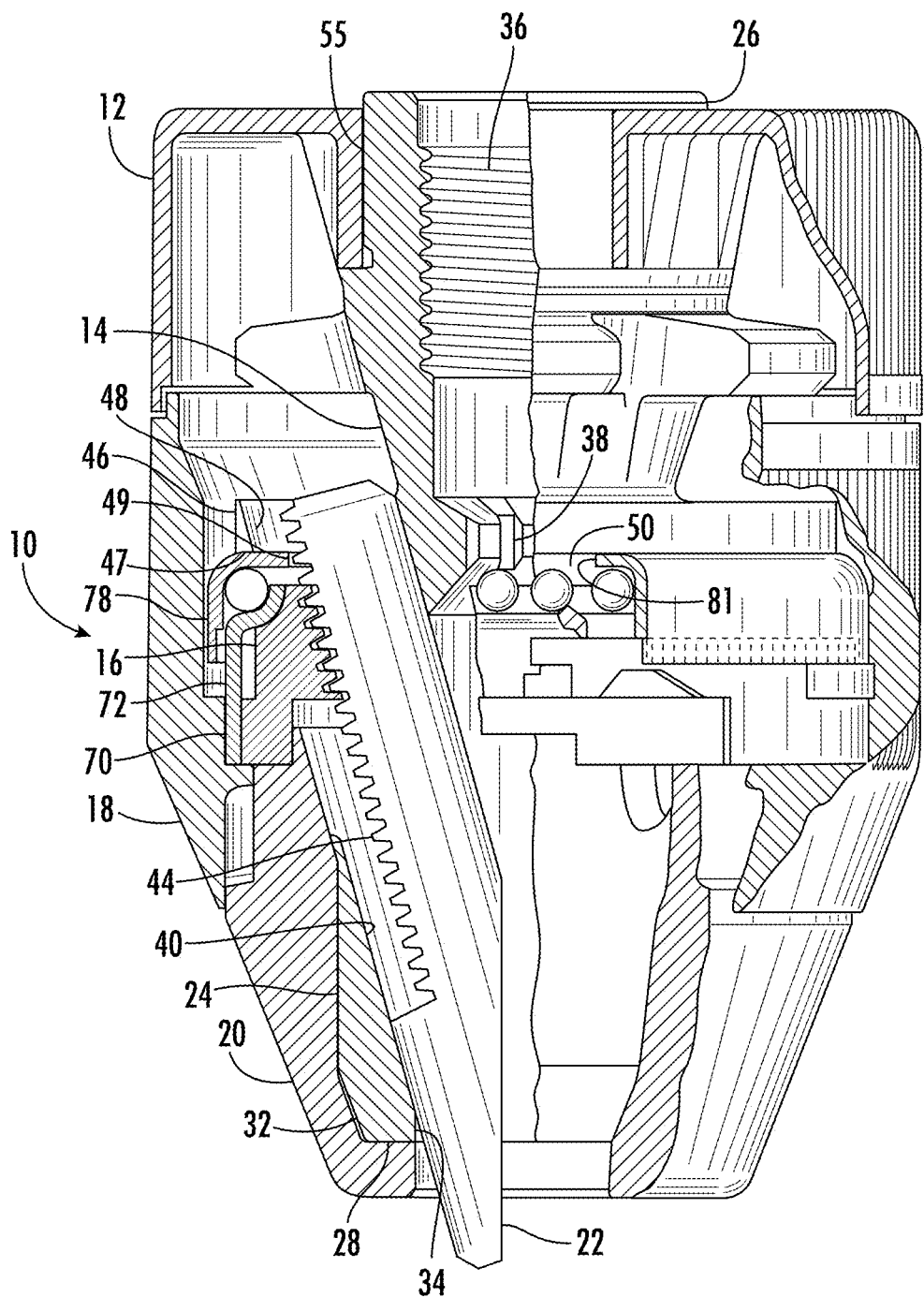
Figure 2:
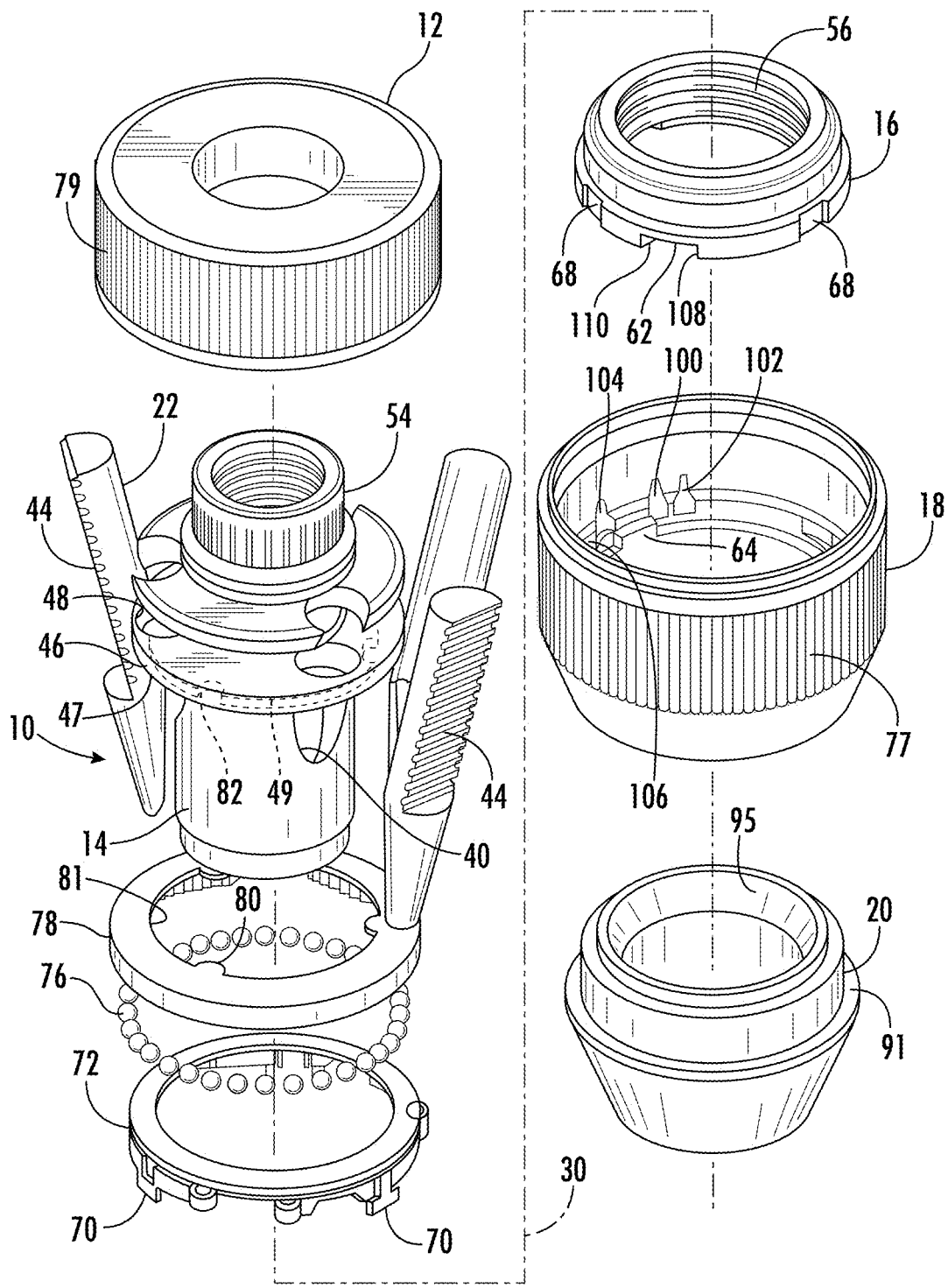
Figure 3:
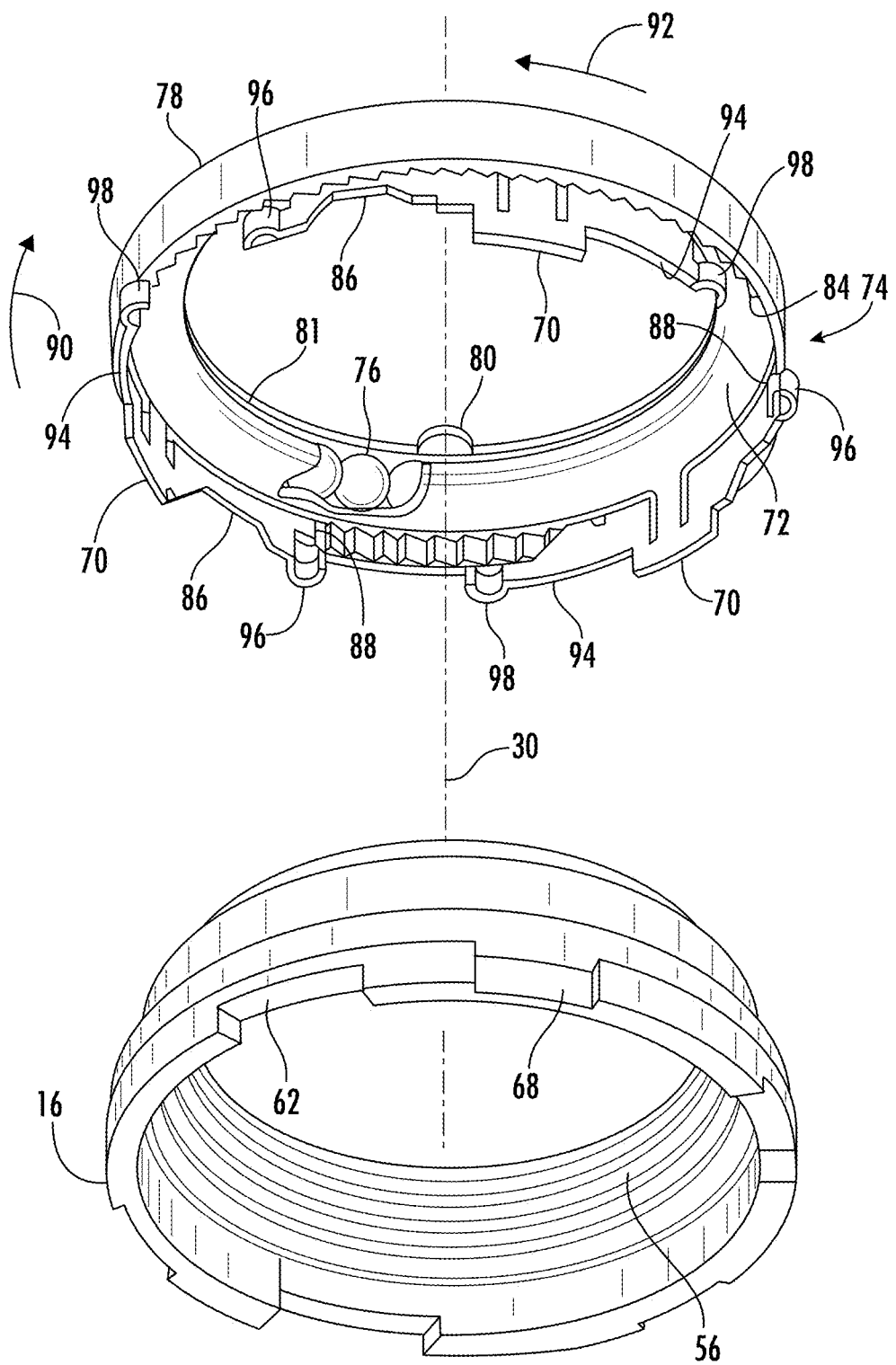
Figure 4A:
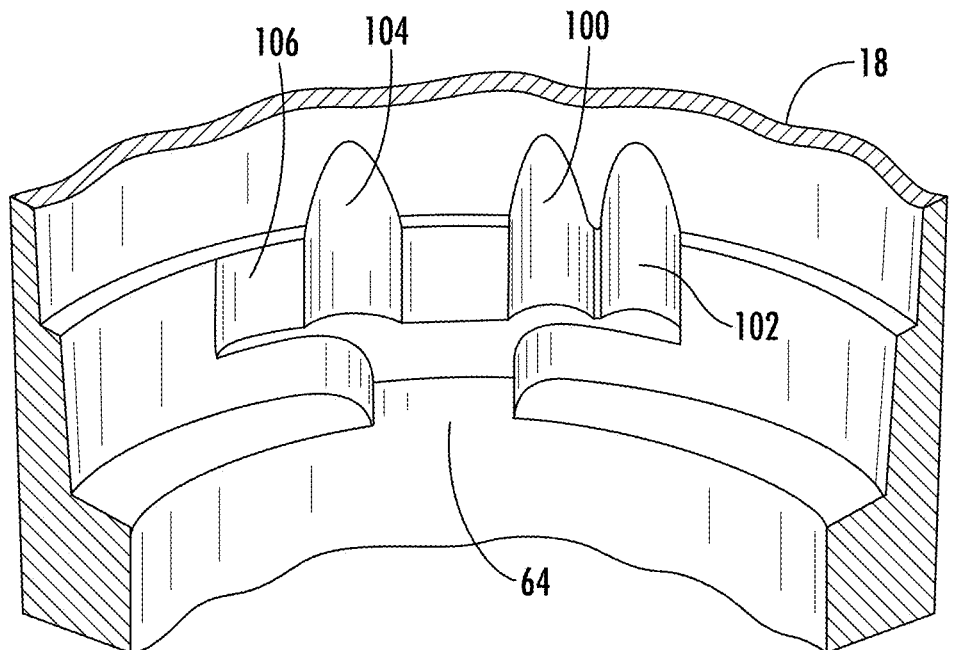
Figure 4B:
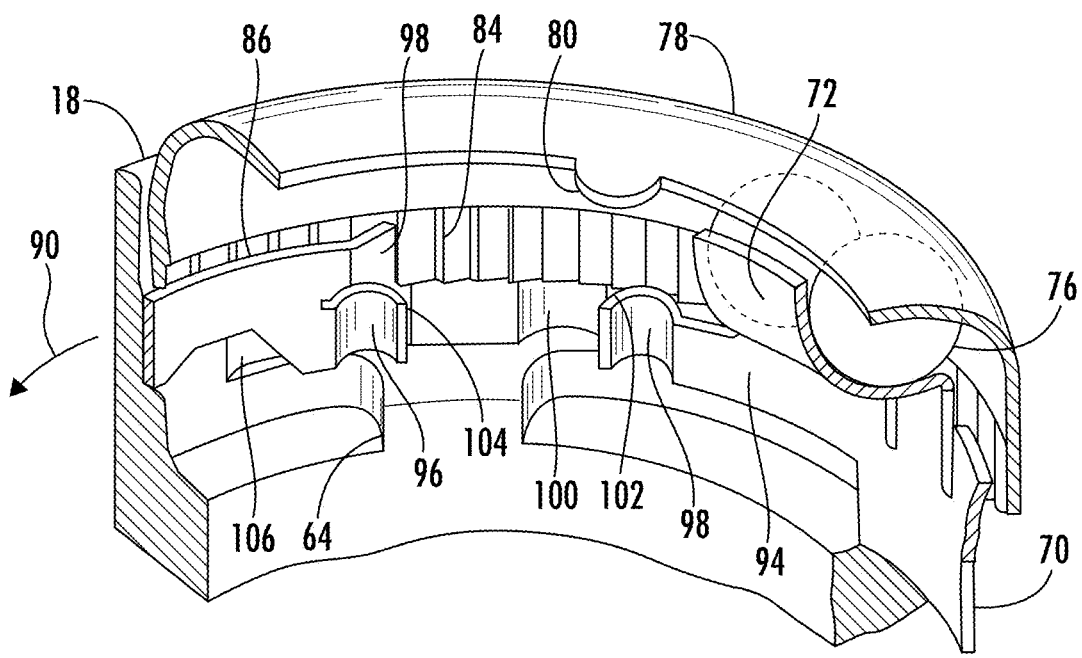
Figure 4C:
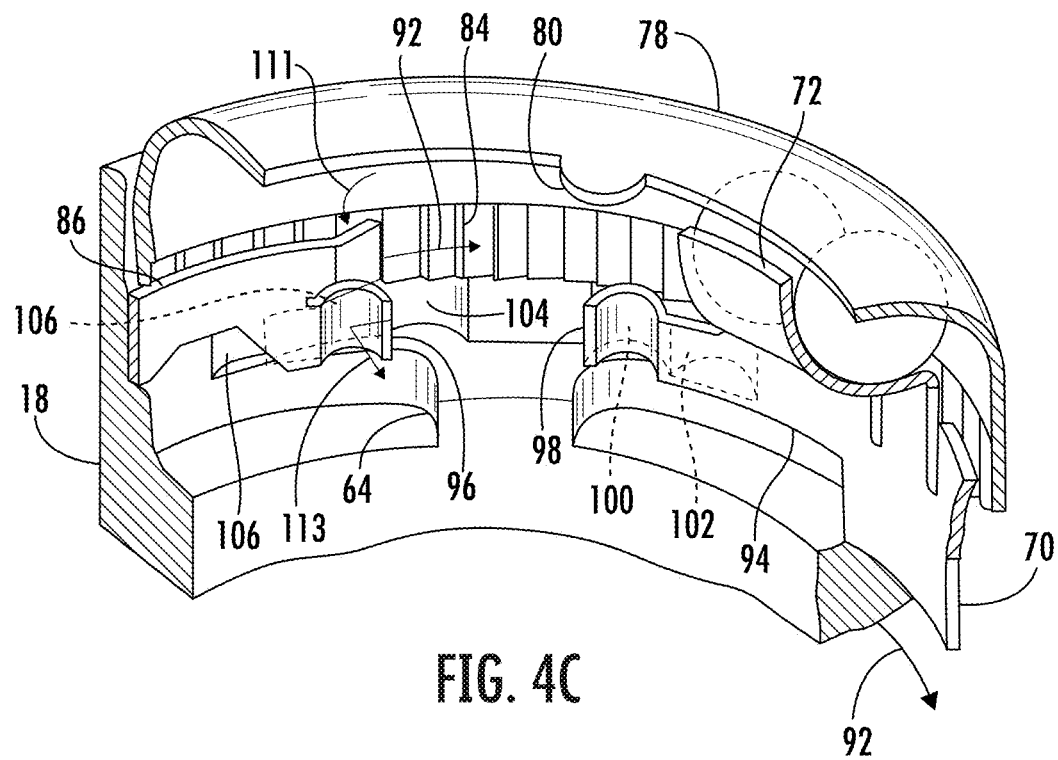
Figure 5:
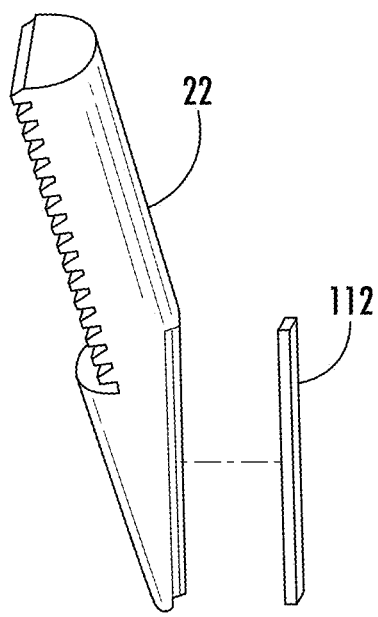
Figure 7A:
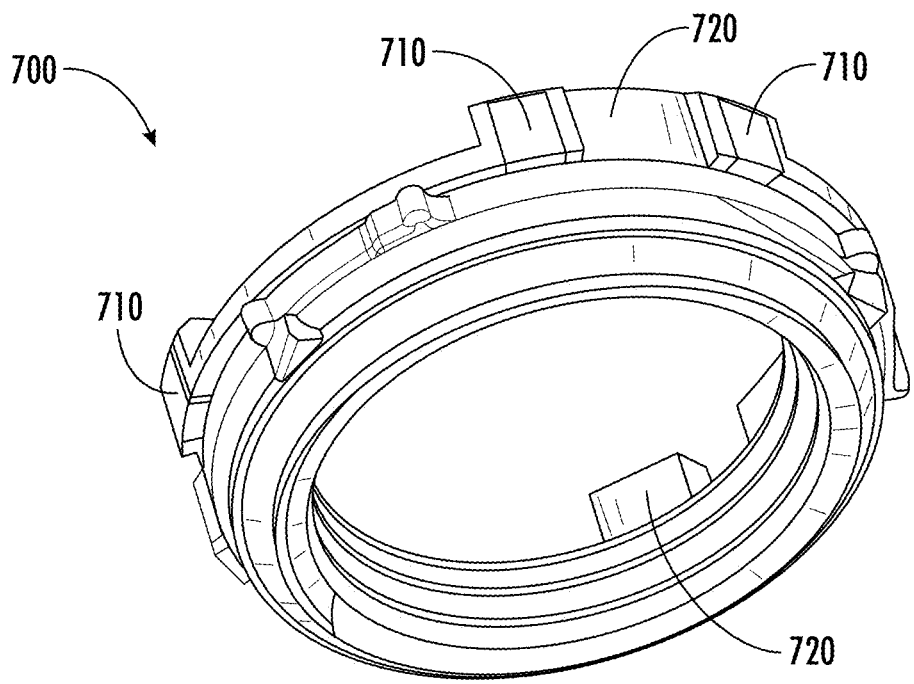
Figure 7B:
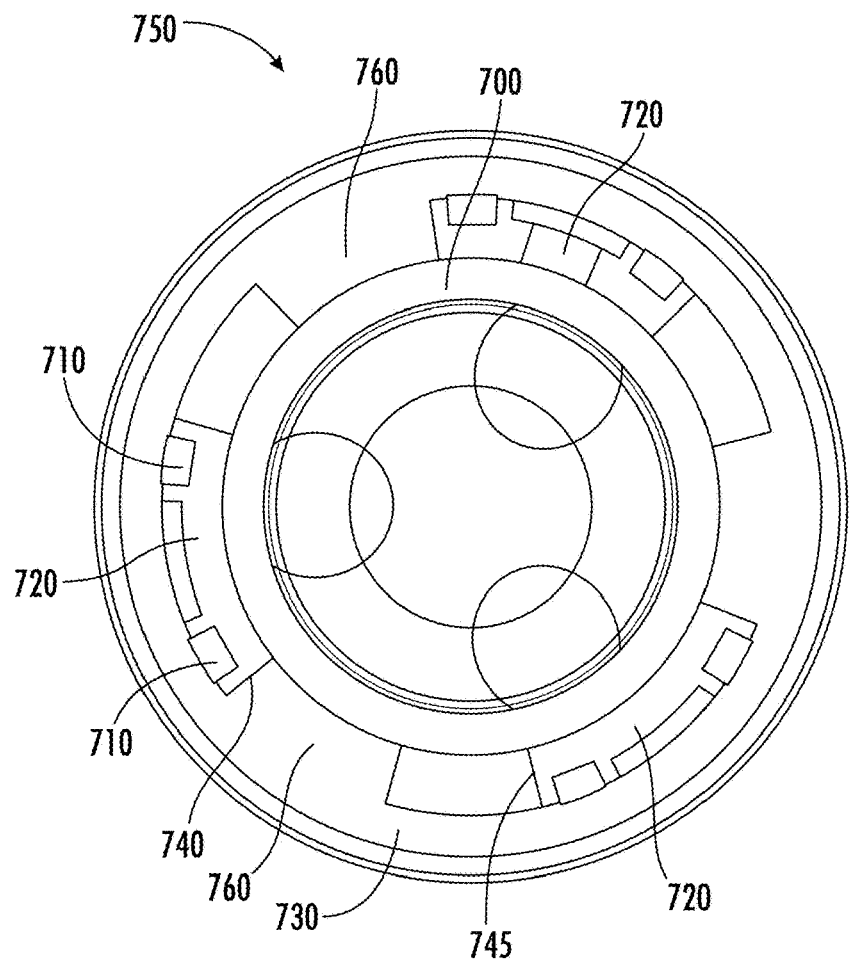
Figure 7C:
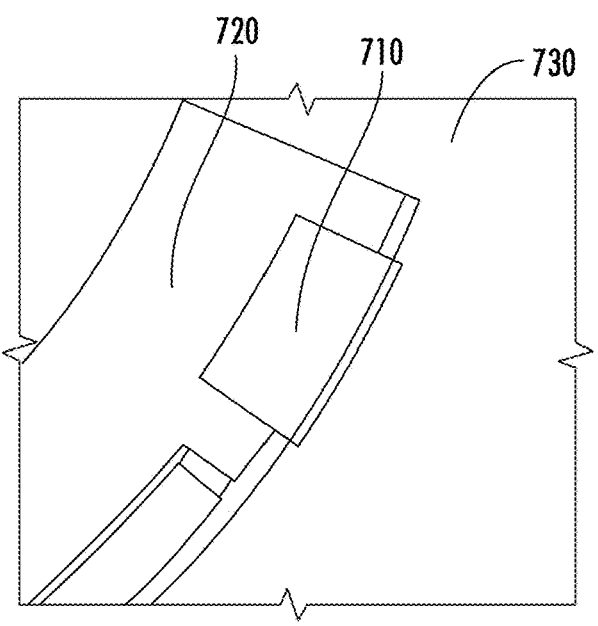
Figure 8A:
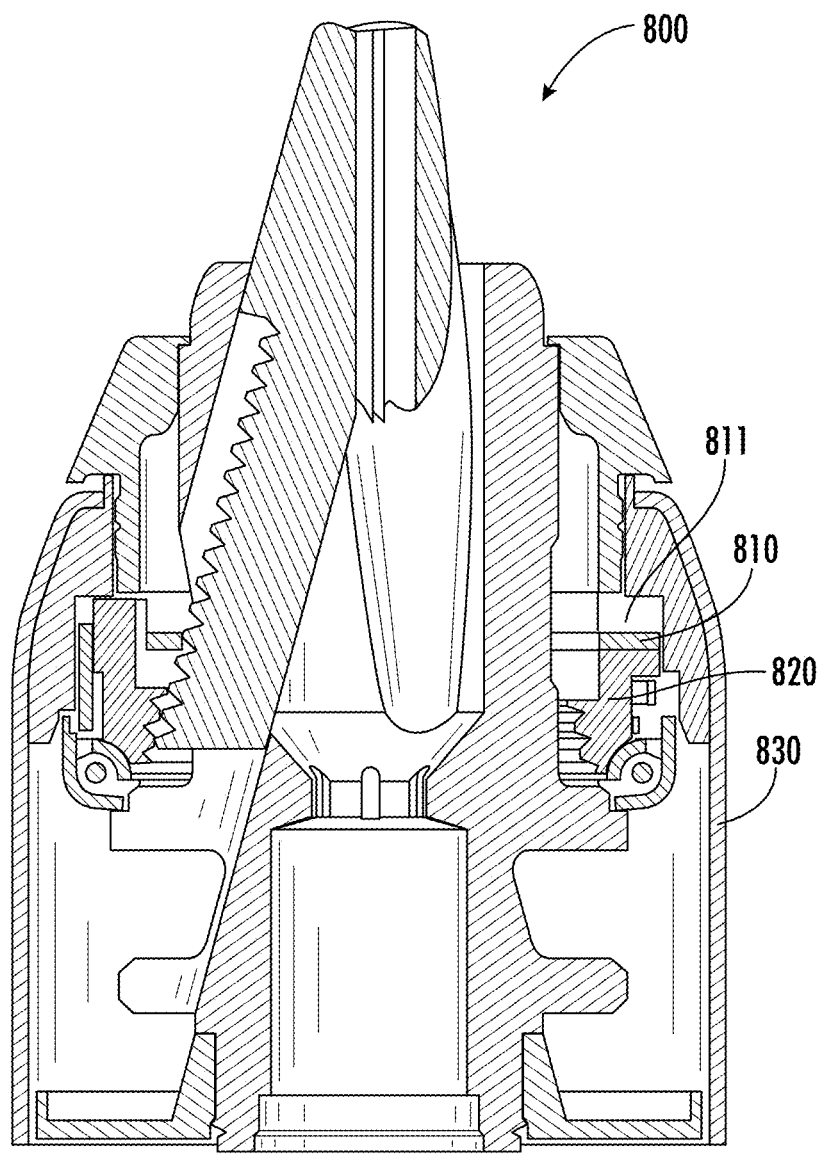
Figure 8B:
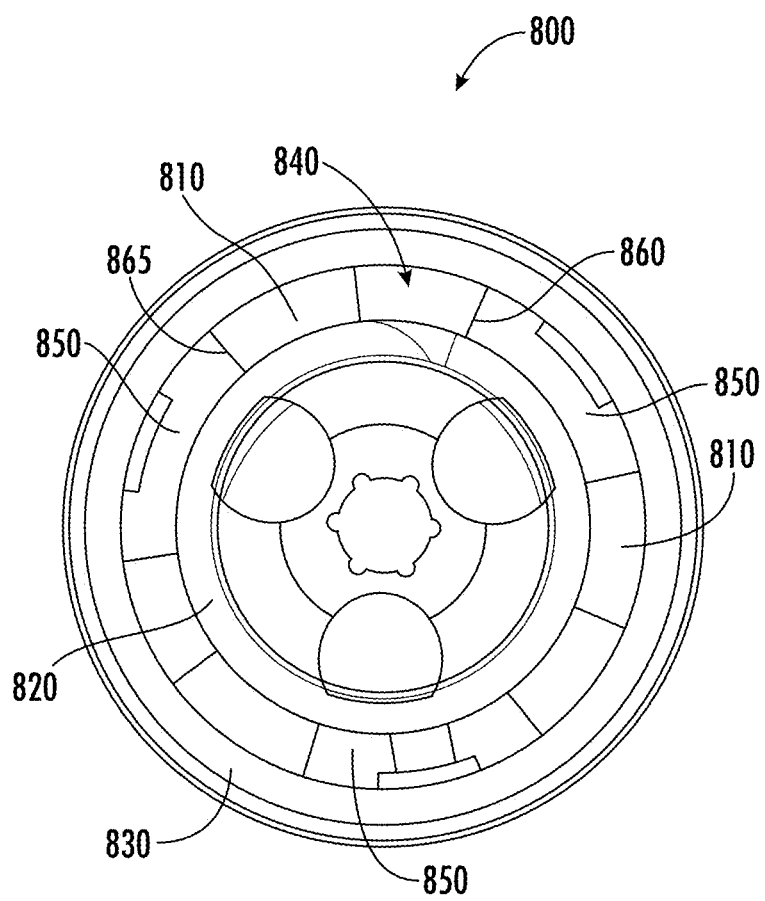
Figure 8C:
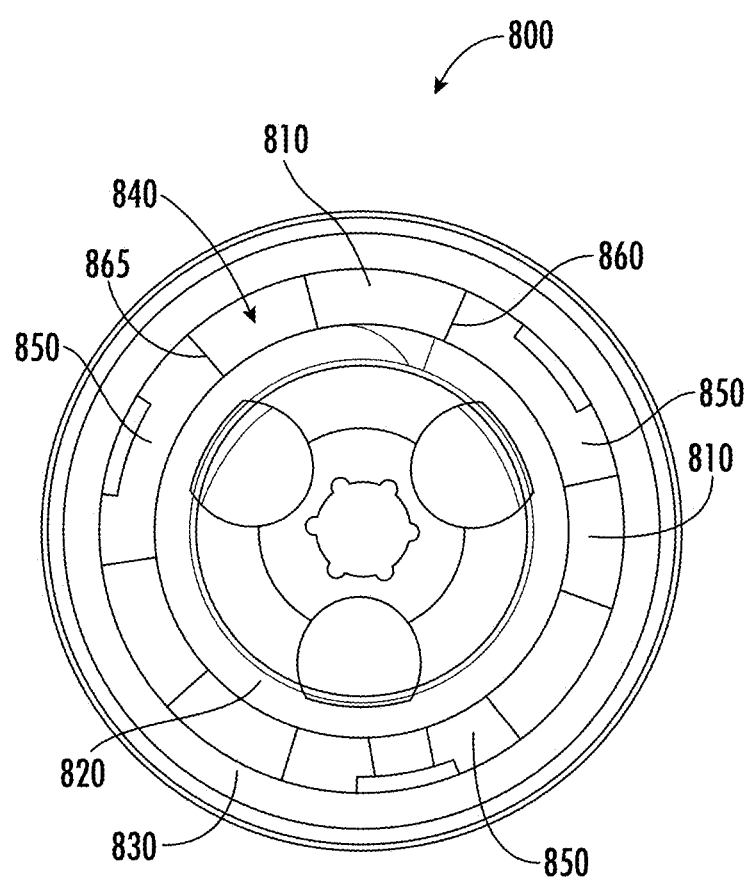
Figure 9A:
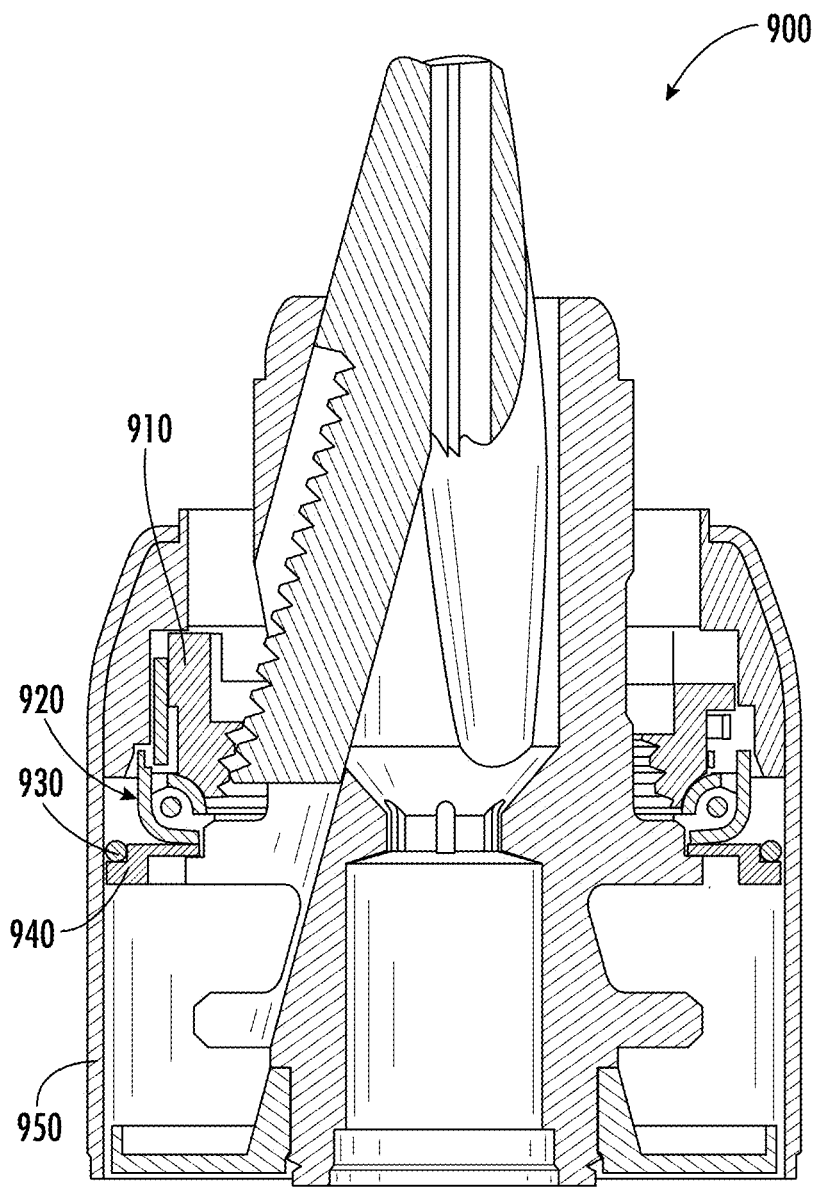
Figure 9B:
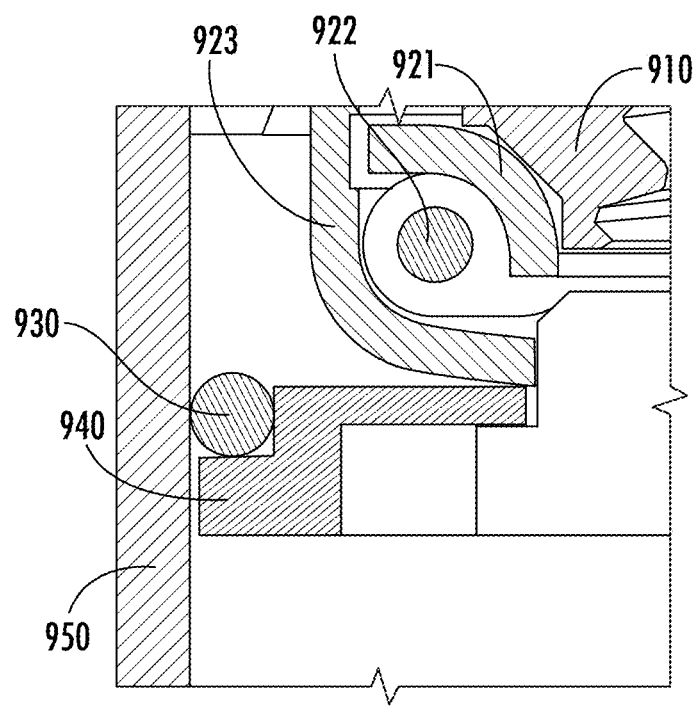
Figure 9C:
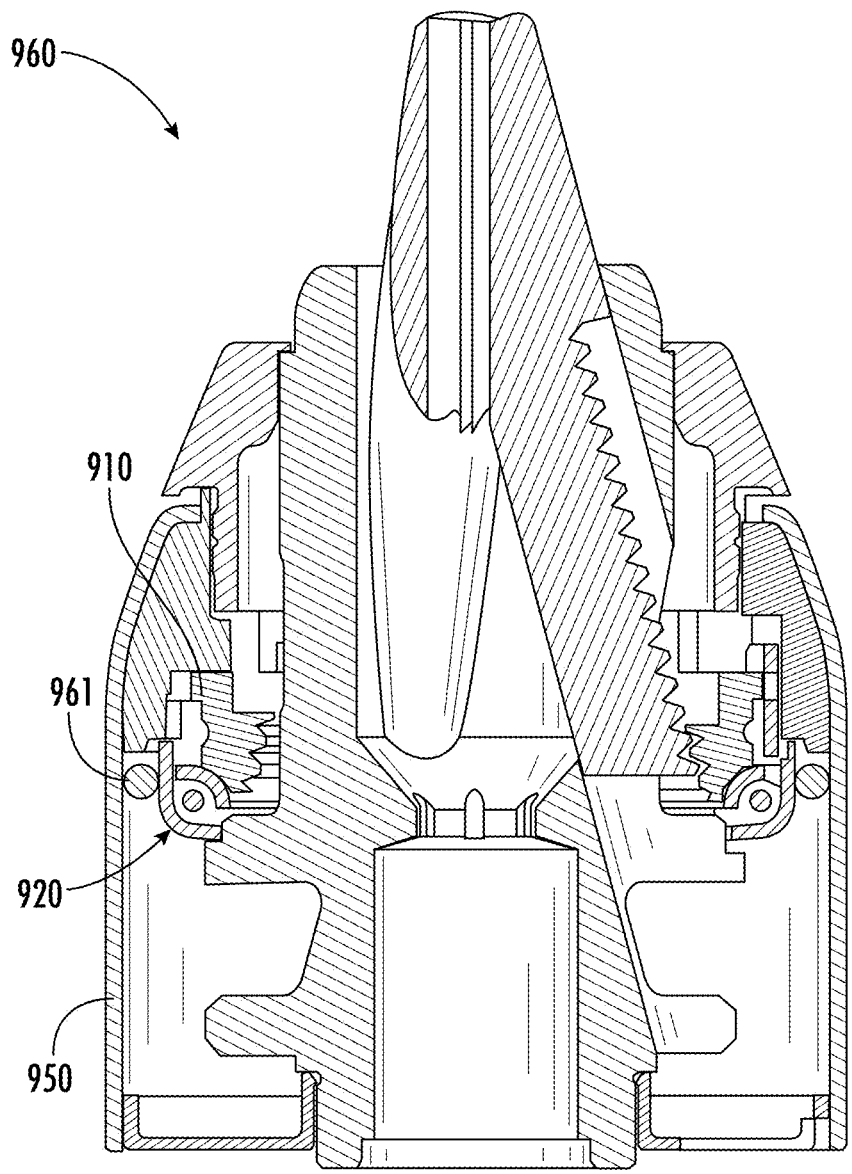
Figure 9D:
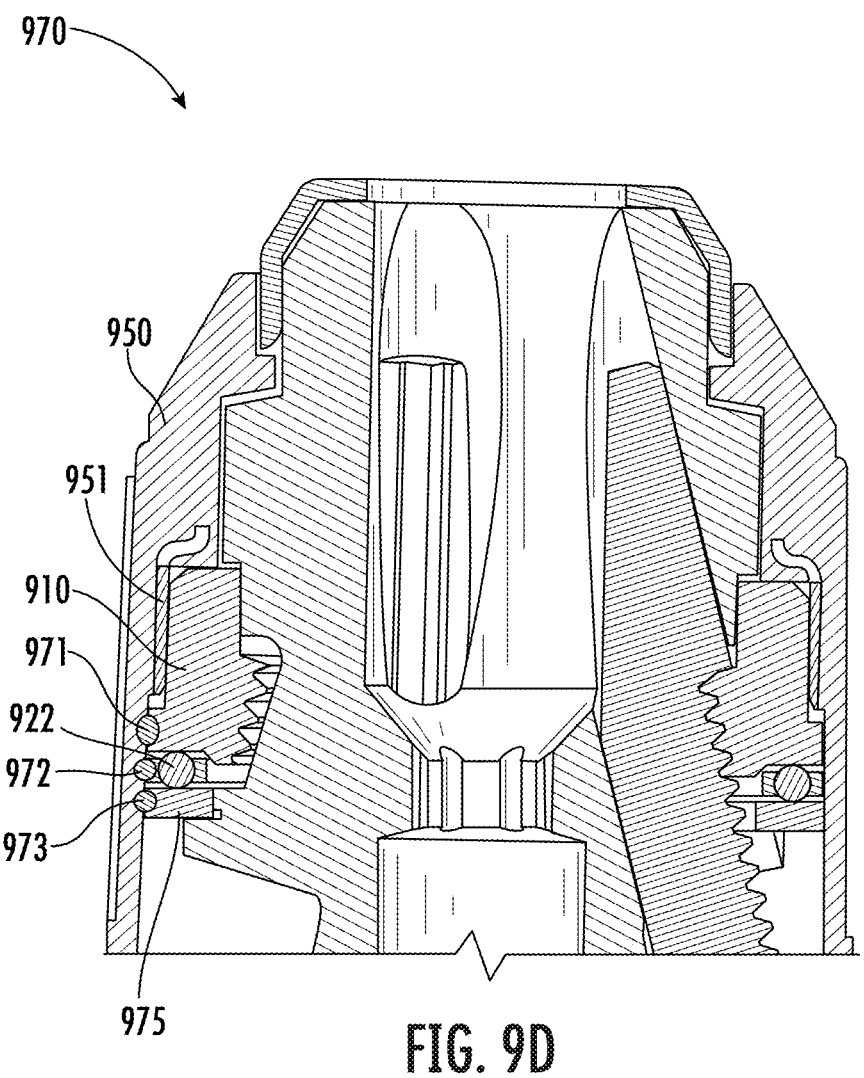
Figure 10A:
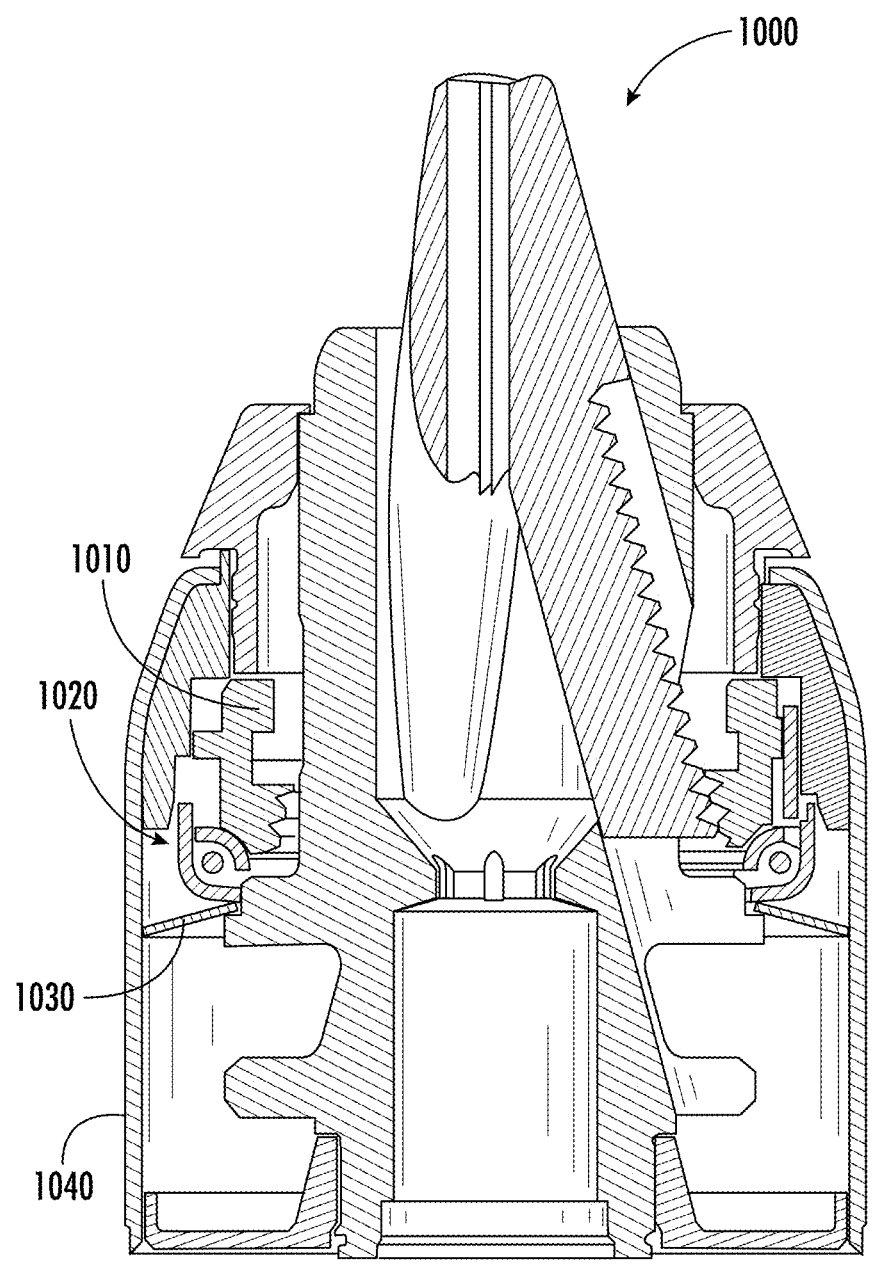
Figure 10B:
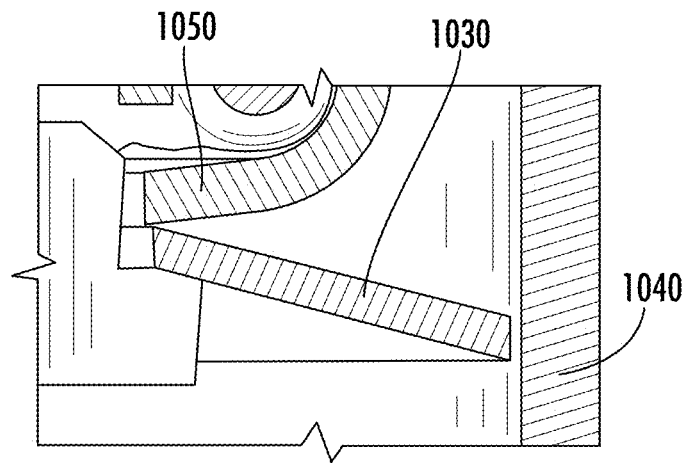
Figure 10C:
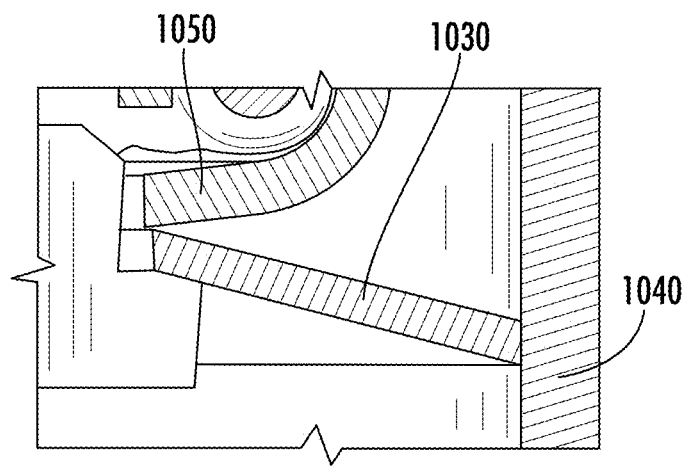
Figure 11A:
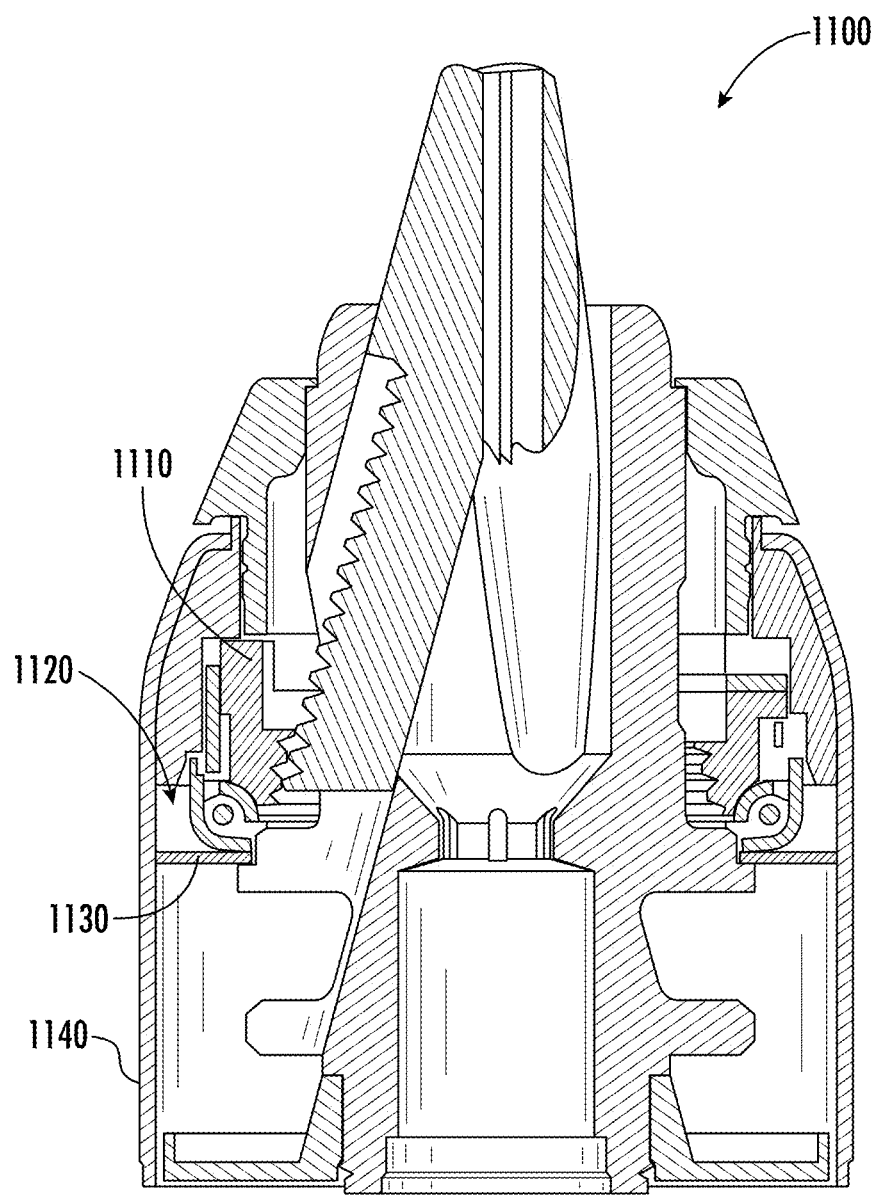
Figure 11B:
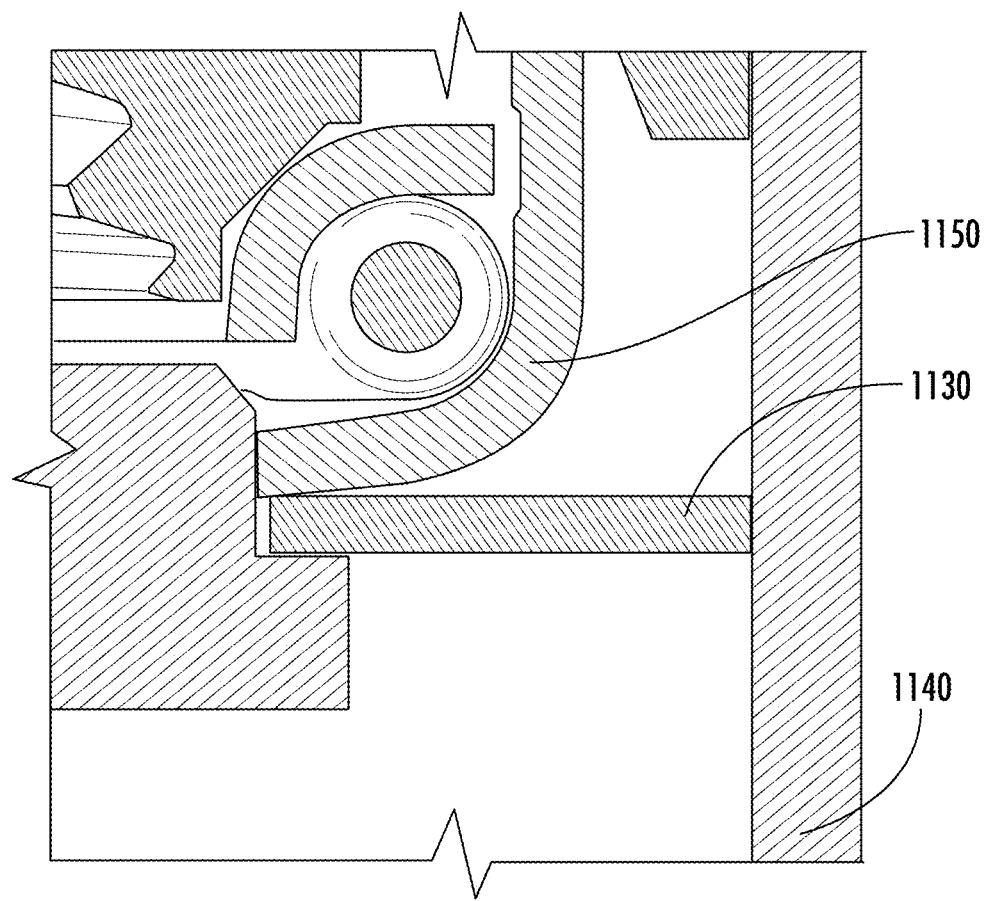

Having thus described the chuck in general terms, reference will now be made to the accompanying drawings, which are not necessarily drawn to scale, and wherein:

FIG. 1 illustrates a longitudinal view, partly in section, of a chuck in accordance with an example embodiment;

FIG. 2 illustrates an exploded view of a chuck as shown in FIG. 1 in accordance with an example embodiment;

FIG. 3 illustrates an exploded view of the bearing and nut of the chuck as shown in FIG. 1 in accordance with an example embodiment;

FIG. 4A illustrates a partial perspective view of the sleeve of the chuck as shown in FIG. 1 in accordance with an example embodiment;

FIG. 4B illustrates a partial perspective view of the bearing and sleeve of the chuck as shown in FIG. 1 in accordance with an example embodiment;

FIG. 4C illustrates a partial perspective view of the bearing and sleeve of the chuck as shown in FIG. 1 in accordance with an example embodiment;

FIG. 5 illustrates a perspective view of a chuck jaw of the chuck as shown in FIG. 1 in accordance with an example embodiment;

FIGS. 6A through 6D illustrate aspects of an example chuck having an anti-vibration assembly in accordance with an example embodiment;

FIGS. 7A through 7C illustrate aspects of another example chuck having an anti-vibration assembly in accordance with an example embodiment;

FIGS. 8A through 8C illustrate aspects of another example chuck having an anti-vibration assembly in accordance with an example embodiment;

FIGS. 9A through 9B illustrate aspects of another example chuck having an anti-vibration assembly in accordance with an example embodiment;

FIG. 9C illustrates aspects of another example chuck having an anti-vibration assembly in accordance with an example embodiment;

FIG. 9D illustrates aspects of another example chuck having an anti-vibration assembly in accordance with an example embodiment;

FIGS. 10A through 10C illustrate aspects of another example chuck having an anti-vibration assembly in accordance with an example embodiment;

FIGS. 11A through 11B illustrate aspects of another example chuck having an anti-vibration assembly in accordance with an example embodiment; and FIGS. 12A through 12D illustrate aspects of an example chuck having an anti-vibration assembly in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

Keyless chucks on power drivers and other rotating devices may vibrate during operation and cause issues such as over-tightening and, as a result, may not be capable of opening by hand in some applications. One example in which over-tightening may occur may be drilling operations in a clutch mode, in which a clutch selectively applies force to the chuck to drive the tool. As the driver is used in a forward direction, the sleeve of the chuck may rotate with the chuck. When the clutch disengages the chuck may stop abruptly causing vibrations, and the inertial force of the sleeve may be transferred to a nut, which, in turn, tightens the jaws on the tool shank causing the over-tightening condition. Repeated operations in the clutch mode may cause incremental tightening, which may result in increased over-tightening of the chuck. Similarly, operation of the driver in a reverse direction may likewise cause vibrations and inertial forces on the sleeve to be transferred to the nut, which, in turn, may loosen the jaws around the tool shank.

In an example embodiment, an anti-vibration assembly may be provided that is a component of or operably coupled to both a sleeve and a nut of a chuck to absorb vibration caused by operation and maintain a position of the sleeve relative to the nut. The anti-vibration assembly may be configured to create friction or drag between the sleeve and the nut to prevent the sleeve from moving out of a locked or unlocked position of the sleeve relative to the nut. Accordingly, the anti-vibration assembly may be configured to prevent vibration and the over-tightening or unintended loosening of the nut. Various example embodiments will now be described in consideration of the context provided by FIGS. 1 through 5.

Referring to FIGS. 1 and 2, a chuck 10 includes a body 14, a nut 16, a front sleeve 18, a nose piece 20 and a plurality of jaws 22. Body 14 may be generally cylindrical in shape and may be formed from metal such as steel, aluminum, or other suitably durable material. Body 14 may include a nose or forward section 24 and a tail or rearward section 26. Nose section 24 may include a front face 28 transverse to the longitudinal center axis 30 of body 14 and a tapered surface 32 at its forward end. The nose section 24 may define an axial bore 34 that may be dimensioned somewhat, for example larger than the largest tool shank that the tool may be designed to accommodate. A threaded bore 36 may be formed in tail section 26 and may be of a size to mate with the drive shaft of a powered or hand driver. The bores 34, 36 may engage at a central region 38 of body 14. While a threaded bore 36 is illustrated, such bore could be replaced with a tapered bore of a size to mate with a tapered drive shaft. According to some example embodiments, body 14 need not include a bore and may be formed integrally with the drive shaft.

Body 14 may define three passageways 40 to accommodate three jaws 22. Each jaw may be separated from the adjacent jaw by an angle of approximately 120 degrees. In some example embodiments, the axes of passageways 40 and jaws 22 may be angled with respect to the chuck 10 center axis 30 such that each passageway axis travels through axial bore 34 and intersects axis 30 at a common point ahead of the body 14. The jaws 22 may form a grip that moves radially toward and away from the center axis 30 to grip a tool, and each jaw 22 may have a tool engaging face 42 generally parallel to the axis 30. According to some example embodiments, the nut 16 may rotate relative to the center axis 30. Threads 44, formed on the opposite or outer surface of jaws 22, may be constructed in any suitable type and pitch. As shown in FIG. 5, each jaw 22 may be formed with carbide inserts 112 pressed into its tool-engaging surface.

As illustrated in FIGS. 1 and 2, body 14 may include a thrust ring 46 that may be integral with the body 14. It should be understood, however, that thrust ring 46 and body 14 may be separate components. Thrust ring 46 may include a plurality of jaw guideways 48 formed around its circumference to permit retraction of jaws 22 therethrough. Thrust ring 46 may also include a ledge portion 50 to receive a bearing assembly, as described below.

Body tail section 26 may include a knurled surface 54 that receives an optional rear sleeve 12 in a press fit at 55. Rear sleeve 12 may also be retained by press fit without knurling, by use of a key or by crimping, staking, riveting, threading or any other suitable securing mechanism. Further, the chuck 10 may be constructed with a single sleeve having no rear sleeve 12.

Nose piece 20 may retain nut 16 against forward axial movement. The nose piece 20 may be press fit to body nose section 24. It should be understood, however, that other methods of axially securing the nut 16 on the body 14 may be used. For example, the nut 16 may be a two-piece nut held on the body 14 within a circumferential groove on the outer circumference of the body 14. Nose piece 20 may be coated with a non-ferrous metallic coating to prevent rust and to enhance its appearance. Examples of suitable coatings include, without limitation, zinc or nickel, although it should be appreciated that any suitable coating could be utilized.

The outer circumferential surface of front sleeve 18 may be knurled or may be provided with longitudinal ribs 77 or other protrusions to enable the operator to grip it securely. In like manner, the circumferential surface of rear sleeve 12, if employed, may be knurled or ribbed as at 79 if desired.

Front sleeve 18 may be secured from movement in the forward axial direction by an annular shoulder 91 on nose piece 20. A frustoconical section 95 at the rearward end of the nose piece facilitates movement of jaws 22 within the chuck 10.

The front sleeve 18 and/or rear sleeve 12 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck 10 may be fabricated may depend on the end use of the chuck 10, and the above materials are provided by way of example only.

Nut 16 has threads 56 for mating with jaw threads 44. Nut 16 may be positioned about the body 14 in engagement with the jaw threads 44 so that when the nut 16 may be rotated with respect to body 14, the jaws 22 will be advanced or retracted depending on the rotational direction of the nut 16.

As illustrated in FIG. 3, the forward axial face of the nut 16 includes nut grooves 62 that receive respective drive dogs 64 (FIG. 2) extending from the inner surface of front sleeve 18. The angular width of the drive dogs 64 may be less than that of the nut grooves 62, resulting in a slight range of relative rotational movement, for example between 4 degrees and 30 degrees, between the nut and the front sleeve 18.

Nut 16 may also define a plurality of grooves formed as flats 68 about the outer circumference of nut 16. Flats 68 may receive respective tabs 70 extending forward from an inner race 72 of a bearing assembly 74. The engagement of tabs 70 and flats 68 may rotationally fix the inner race 72 to the nut 16, although it should be understood that there may be a slight rotational tolerance between the tabs 70 and flats 68. According to some example embodiments, the inner race 72 may operably couple to the nut 16 at surface 49 and may operably couple to bearing elements at 47. Further, the inner race 72 may include an inner edge 81.

Inner race 72 may receive a plurality of bearing elements, in this example bearing balls 76, disposed between the inner race 72 and an outer race 78 seated on thrust ring ledge 50 (FIG. 1). Outer race 78 may be rotationally fixed to body 14 by a plurality of tabs 80 received in corresponding grooves 82 in the thrust ring ledge.

Outer race 78 may also include a ratchet. In the illustrated embodiment, the ratchet may be formed by a plurality of sawtooth-shaped teeth 84 disposed about the inner circumferential surface of the outer race 78. A first pawl 86 may extend from one side of each tab 70 and may be biased radially outward from the inner race 72, thereby urging a distal end 88 of each pawl 86 toward the outer race ratchet.

Each tooth 84 may have a first side with a slope approaching 90 degrees. The second side of each tooth 84 may have a lesser slope. Pawl 86 may be deflectable and may be generally disposed in alignment with the slope of the second side. Thus, rotation of inner race 72 in a closing direction 90 with respect to outer race 78 may move pawl distal ends 88 repeatedly over teeth 84, causing a clicking sound, as ends 88 fall against each subsequent tooth's second side. This configuration of teeth 84 and pawl 86, however, may prevent the rotation of the inner race 72 in an opening direction 92. Application of rotational force to the inner race 72 in the opening direction 92 forces distal ends 88 into the steep-sloped first sides of teeth 84. Since pawl 86 may be generally perpendicular to the first sides, pawl 86 need not deflect inward to permit rotation.

As discussed below, closing direction 90 corresponds to the tightening of jaws 22, while opening direction 92 corresponds to loosening of the jaws 22. Accordingly, when pawls 86 engage ratchet teeth 84, the teeth may permit the movement of the inner race 72 in the opening direction 92, but prevent the movement of the inner race 72 in the closing direction 90.

A second deflectable pawl 94 may extend to the other side of each tab 70. Like pawls 86, each pawl 94 may be biased radially outward. Unlike pawls 86, however, pawls 94 may not engage the outer race ratchet.

Pawls 86 and 94 may include tabs 96 and 98 at their distal ends. Referring also to FIG. 4A, an inner circumferential surface of front sleeve 18 may define first and second recesses 100 and 102. During the operation, each tab 98 may be received in one of these recesses 100,102, depending on the rotational position of the front sleeve 18 with respect to the nut 16, as discussed in more detail below. The front sleeve 18 may also define a third recess 104 and a cam surface 106. Also depending on the rotational position of the front sleeve, each tab 96 may be received either by the cam surface or by recess 104. The front sleeve 18 may include the pair of recesses 100, 102 for each tab 98 and a recess 104 and cam surface 106 for each tab 96.

FIG. 4C illustrates the disposition of pawls 86 and 94 when front sleeve 18 may be in a first of two positions with respect to nut 16 (FIG. 2), while FIG. 4B illustrates these components when the front sleeve 18 is in a second position with respect to the nut 16. For ease of illustration, both FIGS. 4B and 4C omit the nut 16. However, referring to FIG. 2 and to the second position of the front sleeve 18, as shown in FIG. 4B, each drive dog 64 may be disposed against or adjacent to a first engagement edge 108 of the nut groove 62 in which each drive dog 64 may be received. Each of the recesses 102 of front sleeve 18 may receive tab 98 of one of the pawls 94, and each recess 104 receives tab 96 of one of the pawls 86. Accordingly, the distal end 88 of each pawl 86 may engage ratchet teeth 84, and inner race 72 may rotate only in the opening direction 92 with respect to outer race 78.

Referring now to FIG. 4C, when inner race 72 moves in the opening direction 92 with respect to the outer race 78, each tab 98 moves out of recess 102 and into recess 100, as indicated by arrow 111. Each tab 96 rides up and out of its recess 104 onto its cam surface 106, as indicated by arrow 113. As indicated by arrow 112, the tabs 96 riding up and out of recesses 104 may push each deflectable tab 86 radially inward, thereby disengaging distal ends 88 from ratchet teeth 84. Thus, the inner race 72 may be free to rotate with respect to the outer race 78.

As described in more detail below, when front sleeve 18 rotates in the opening direction 92 so that the inner race 72 moves from the position shown in FIG. 4B to the position shown in FIG. 4C, drive dogs 64 may move within nut grooves 62 of nut 16 (FIG. 2) so that each drive dog 64 may be against or immediately adjacent to a second engagement edge 110 of the nut groove 62.

In operation, and referring to FIGS. 2, 3, 4B and 4C, nut grooves 62 receive drive dogs 64 when the chuck 10 may be between fully opened and fully closed positions so that the drive dogs 64 are adjacent the first engagement edges 108. Inner race 72 may be disposed with respect to outer race 78 so that tabs 96 and 98 are received by cam surface 106 and recess 100, respectively. Front sleeve 18 may be in the first position with respect to the nut 16. In this condition, tabs 98 and recesses 100 rotationally fix inner race 72 to front sleeve 18. Since inner race 72 may be rotationally fixed to nut 16 by tabs 70 and flats 68, an operator rotating front sleeve 18 rotationally drives the nut through inner race 72, thereby opening or closing the jaws 22. When the operator rotates the front sleeve 18 in the closing direction 92 to the point that the jaws 22 tighten onto a tool shank, the nut 16 may be urged rearward up the jaw threads 44, thereby pushing the nut against inner race 72, bearing elements 76, outer race 78 and thrust ring 46. The rearward force creates a frictional lock between the nut 16 and inner race 72 that further rotationally fixes the nut 16 and inner race 72.

The wedge between the nut threads 56 and jaw threads 44 increasingly resists the rotation of nut 16. When the operator continues to rotate front sleeve 18, and the resistance overcomes the hold provided by tabs 98 in recesses 100, front sleeve 18 rotates with respect to nut 16 and inner race 72. This moves drive dogs 64 from second engagement edge 110 to the first engagement edge 108 of nut grooves 62 and pushes tabs 98 out of recesses 100 into recesses 102. Simultaneously, cam surfaces 106 rotate away from tabs 96 so that the tabs 96 are released into recesses 104, thereby engaging distal ends 88 of pawls 86 with ratchet teeth 84, as shown in FIG. 4B. At this point, inner race 72, and therefore nut 16, may be rotationally locked to outer race 78 and body 14, against rotation in the opening direction 92. In other words, the nut 16 may be rotationally locked to the body 14 in the opening direction 92. Since the rotation of the nut 16 with respect to the body 14 may be necessary to open the jaws 22 of the chuck 10, the rotational locking of the nut 16 may prevent inadvertent opening during use.

Inner race 72, and therefore nut 16, may, however, still rotate with respect to outer race 78, and therefore body 14, in the closing direction 90. During rotation in the closing direction 90, front sleeve 18 may drive nut 16 through drive dogs 64 against first engagement edge 108, as well as through inner race 72. Further rotation of the front sleeve 18 in the closing direction 92 may continue to tighten the chuck 10 and, as described above, may produce a clicking sound to notify the operator that the chuck 10 is in a fully tightened position.

To open the chuck 10, the operator may rotate front sleeve 18 in the opening direction. Front sleeve 18 transfers torque to inner race 72 at the engagement of tabs 96 and 98 in recesses 104 and 102, respectively. Because pawls 86 engage outer race 78, which may be rotationally fixed to the body, through the ratchet teeth, the inner race 72 may not rotate with the front sleeve 18. Thus, upon application of sufficient torque in the opening direction 92, front sleeve 18 moves with respect to the inner race 72 and the nut 16. Rotating the front sleeve 18 in the opening direction 92 may move tabs 96 back up onto cam surfaces 106, thereby disengaging pawls 86 from ratchet teeth 84. Tabs 98 may move from recesses 102 into recesses 100, and drive dogs 64 move from the first engagement edges 108 to the second engagement edges 110 of the nut grooves 62. Thus, the front sleeve 18 may move to its first position with respect to the nut 16, as shown in FIG. 4C, and the inner race 72 and nut 16, are free to rotate with respect to the outer race 78 and body 14. Accordingly, further rotation of front sleeve 18 in the opening direction 92 may move jaws 22 away from the enter axis 30, thereby opening the chuck 10.

It should be understood that the embodiments illustrated in FIGS. 1-5 are provided by way of explanation only and that the chuck 10 may be realized in any suitable form. For example, the pawls and ratchet may be formed in any suitable configuration. In an example embodiment, a chuck 10 may include a body, a nut that may be axially fixed to and rotationally movable with respect to the body, and an outer sleeve that engages the nut to rotate the nut. The jaws may be axially fixed to the nut and received in body passageways so that the radial movement of the nut drives the jaws toward and away from the center axis. In this configuration, the outer sleeve may be permitted to rotate over a limited angular distance with respect to a second, inner, sleeve. A bearing including a ratchet configuration, as discussed above, may be disposed between the inner sleeve and the body 14. Still further, depending on the chuck configuration, the pawls and ratchet may be interchanged as appropriate.

FIGS. 6A through 12D illustrate various example embodiments that may be implemented in association with an example chuck, such as chuck 10. Some example embodiments incorporate an anti-vibration assembly configured to absorb vibration caused by operation of a device driving the chuck and maintain a position of the sleeve (e.g., sleeve 18) relative to the nut (e.g., nut 16). In this regard, according to some example embodiments, a chuck for use with a powered driver having a rotatable drive shaft is provided. The chuck may have a body including a nose section and a tail section. The tail section may be configured to rotate with the drive shaft and the nose section may have an axial bore formed therein and a plurality of passageways formed therethrough and intersecting the axial bore. The chuck may further comprise a plurality of jaws movably disposed in the passageways, and a nut rotatably mounted about the body and operably coupled with the jaws such that rotation of the nut in a closing direction moves the jaws toward an axis of the axial bore and rotation of the nut in an opening direction moves the jaws away from the axis. The chuck may further comprise a sleeve rotatably mounted about the body. The sleeve may be operably coupled to the nut such that the sleeve selectively rotates the nut. In this regard, the sleeve may be configured to rotate relative to the nut when transitioning between a locked position and an unlocked position. According to some example embodiments, the chuck may further comprise an anti-vibration assembly operably disposed between the sleeve and the nut, wherein the anti-vibration assembly is configured to absorb vibration caused by operation of the power driver and maintain a position of the sleeve relative to the nut when the sleeve is in the locked position or the unlocked position. Because of the interaction between the sleeve and the nut with the anti-vibration assembly, vibration, wobble, and runout of the of the sleeve may be avoided.

Figure 6A:
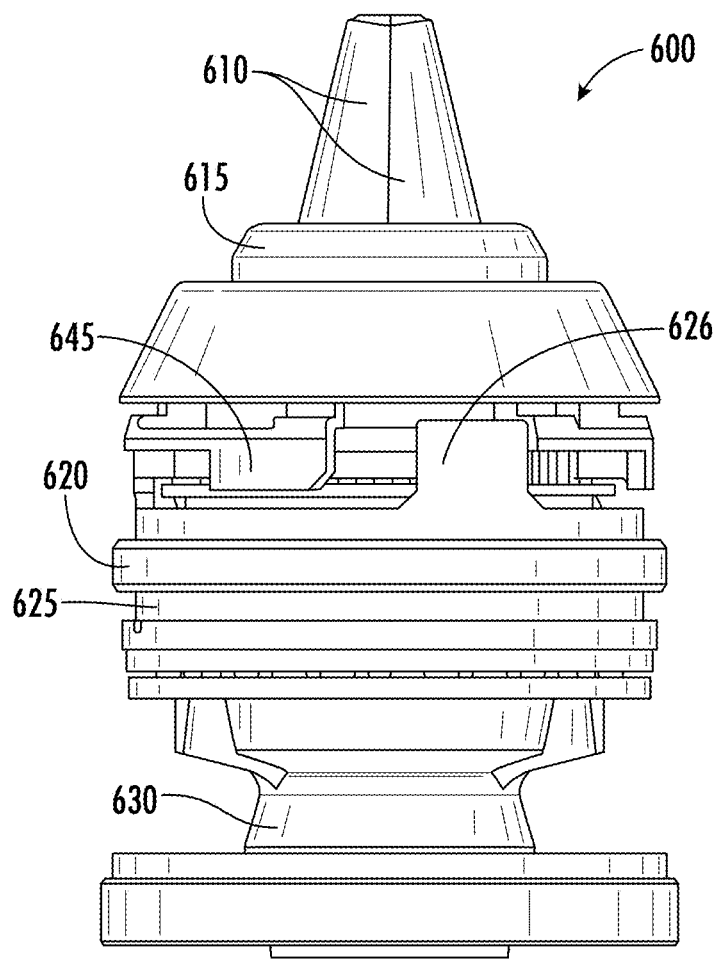
Figure 6B:
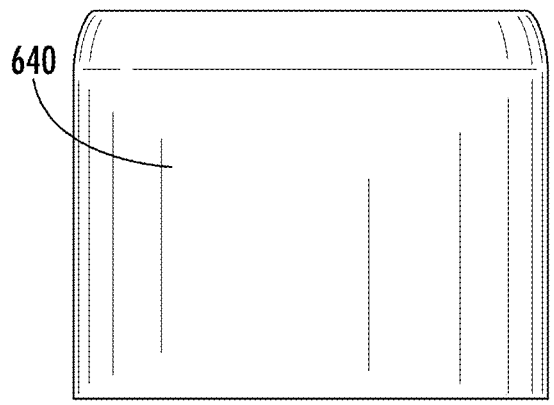

In this regard, FIGS. 6A-6D illustrate an example embodiment of a chuck having an anti-vibration assembly including an elastic member affixed to a surface that rotates with the nut and is compressed against the sleeve. An example chuck 600 is shown in FIG. 6A. Similar to the chuck 10, the chuck 600 may include movable jaws 610, a nose body section 615, a nut 625, and a tail body section 630.

The chuck 600 may also include an anti-vibration assembly comprising an elastic member that is, for example, a ring 620. The ring 620, which may be a type of O-ring, may be formed of an elastic material such as rubber. The ring 620 may be affixed to the nut 625 or a surface that rotates with the nut 625 in a number of ways such as via an adhesive or by being compressed around the nut 625, possibly in a circular groove in the nut 625. In this regard, the ring 620 may be affixed to a nut retainer which may be a component of the nut 625. The ring 620 may encircle the nut 625. The ring 620 may operably couple with an internal surface of a sleeve 640 of FIG. 6B which may be affixed to an internal sleeve actuator 645. The sleeve 640 may be, for example, press fit around the nut 625 in engagement with the ring 620. Internal sleeve actuator 645 may be configured to rotate from an unlocked position into a locked position where it physically engages with nut tab 626. During this movement of the sleeve 640 into the locked position, the ring 625 may provide drag on the movement of the sleeve 625, as that actuator 645 moves relative to the nut 625. This drag may operate to prevent unexpected movement of the sleeve 640 when, for example, the sleeve 640 is in the locked or unlocked position. Additionally, the inclusion of the ring 625 may operate to dampen vibration.

Figure 6C:
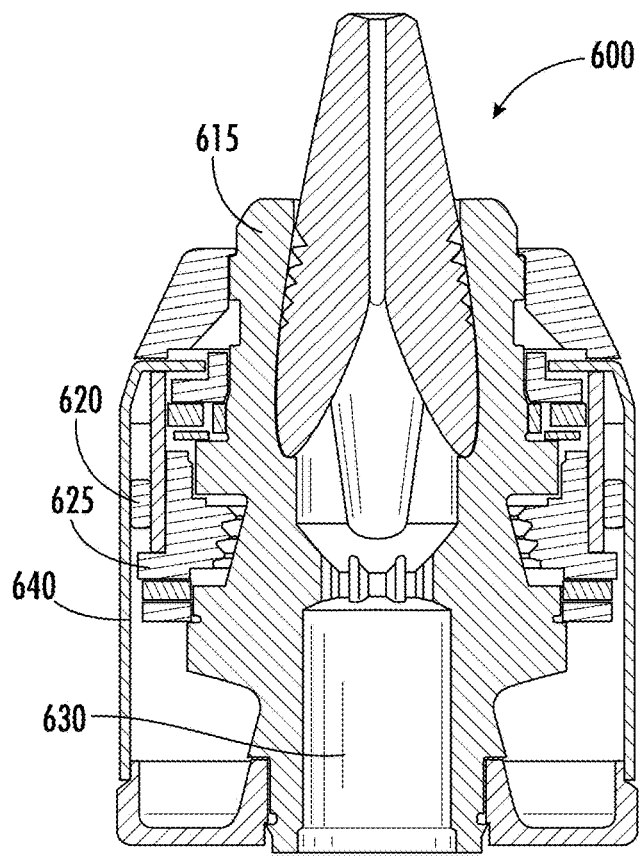
Figure 6D:
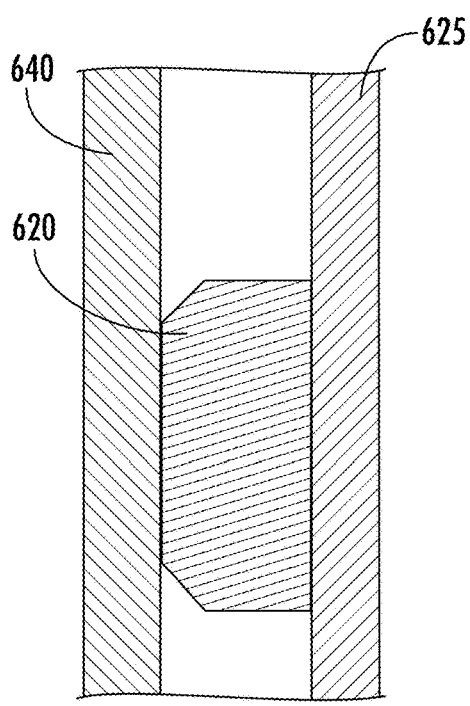

As can be seen in the side cross-section view of FIG. 6C and more closely in FIG. 6D, the ring 620 may be affixed to a surface that rotates with the nut 625, such as on the nut 625 itself or a component of the nut 625 (e.g., a nut retainer) either directly or via another element that operates in conjunction with the nut 625. With reference to FIG. 6D, it can be seen that the ring 620 may be in contact with the sleeve 640, such that the ring 620 has an interference, compressed fit with the sleeve 640.

Due to the high friction surface of the ring 620 and the interference, compressed fit of the ring 620 between the nut 625 and the sleeve 640, the sleeve 640, when rotated, may cause the nut 625 to also rotate. However, when the sleeve 640 transitions between the locked position and the unlocked position (either during operation of the chuck or in response to an inertial event) and there is relative movement between the sleeve 640 and the nut 625, the ring 620 may apply a resistive drag force on the sleeve 640 and may operate to hold the sleeve 640 in position relative to the nut 625. Further, when the jaws 610 are engaged with a tool shank and the nut 625 has been tightened, the sleeve 640 may be rotated to loosen the nut 625 to remove the tool shank. As the sleeve 640 is turned, resistance or drag caused by the ring 620 may be overcome allowing for the sleeve 640 to move relative to the nut 625 from the locked to the unlocked position.

Another example embodiment of an anti-vibration assembly is shown in FIGS. 7A-7C. In this regard, the anti-vibration assembly may comprise an elastic member in the form of a plurality of pads 710 affixed to a nut 700. The pads 710 may be, for example, elastic and have a high coefficient of friction. The pads 710 may be affixed to a protruded portion 720 of the nut 700.

As can be seen in FIG. 7B, which is a top cross-section view of a chuck 750, the pads 710 may be affixed to the protruded portion 720 and therefore the pads 710 may be disposed between the nut 700 and the sleeve 730. The pads 710 may operably couple with an internal surface of a sleeve 730. The sleeve 730 may be, for example, press fit around the nut 625 in engagement with the pads 710.

As can be seen in FIG. 7B and more closely in FIG. 7C, the pads 710 may be affixed to the nut 700 via a protruded portion 720 of the nut 700. With reference to FIG. 7C, it can be seen that the pad 710 may be in contact with the sleeve 730, such that the pads 710 engage with an interference, compressed fit with the sleeve 730.

As can be best seen in FIG. 7B, the sleeve 730 may include one or more (e.g., three) sleeve lugs 760 that are configured to rotatably move between respective protruded portions 720 of the nut 700 to thereby transition the sleeve 730 between the locked position and the unlocked position. The protruded portions 720 may be positioned radially about a center of the nut 700 at, for example, 120 degrees apart.

In this regard, the sleeve 730 of FIG. 7B is depicted in a locked state. In the locked state, the sleeve 730 may have been rotated counterclockwise such that a side of the sleeve lug 760 abuts an wall 740 of a protruded portion 720 of the nut 700. Further, to untighten the chuck 750, the sleeve 730 may be turned clockwise, to overcome the drag created by the pads 710, such that the sleeve lug 760 abuts an opposite wall 745 of the protruded portion 720.

Due to the high friction surface of the pads 710 and the interference, compressed fit of the pads 710 between the nut 700 and the sleeve 730, the sleeve 730, when rotated, may cause the nut 700 to also rotate. However, when the sleeve 730 transitions between the locked and unlocked position and moves relative to the nut 700, the sleeve 730 may be subjected to frictional drag due to the presence of the pads 710. Further, when the jaws of the chuck 750 are engaged with a tool shank and the nut 700 has been tightened, the sleeve 730 may be rotated to loosen the nut 700 to remove the tool shank. As the sleeve 730 is turned, resistance or drag caused by the pads 710 may be overcome thereby permitting the sleeve 730 to move relative to the nut 700 and transition to the unlocked position where the sleeve lug 760 abuts the inner wall 745 of the protruded portion 720.

Another example embodiment of an anti-vibration assembly is shown in FIGS. 8A-8C. In this regard, the anti-vibration assembly may comprise one or more magnets 810. With reference to FIG. 8A, a chuck 800 is shown with magnet 810 in association with a nut 820 and a sleeve 830. The magnet may be affixed to an underside of a sleeve lug 811. According to some example embodiments, the nut 820 may comprise a ferromagnetic material (e.g., iron) and the interaction between the magnet 810 and the nut 820 may tend to maintain a current position of the sleeve 830 and the sleeve lug 811 but also permit the sleeve 830 to move relative to the nut 820 to rotate into the locked or unlocked positions when an attraction force between the magnet 810 and the nut 820 is overcome.

As shown in FIG. 8B, which is a top cross-section view of the chuck 800, the magnets 810 (e.g., three magnets) may be affixed to respective sleeve lugs 811 (not shown in FIGS. 8B and 8C) of the sleeve 830 and the nut 820 may include protruded portions 850 that may interact the a respective magnets 810. Since the magnets 810 are affixed to the sleeve lugs 811 of the sleeve 830, the magnets 810 may rotatably move relative to the protruded portions 850 as the sleeve 830 moves between the locked and unlocked positions. The magnets 810 and the protruded portions 850 may be positioned radially about a center of the chuck 800 at, for example, 120 degrees apart.

In this regard, the sleeve 830 of FIG. 8B is depicted in an unlocked position. In the unlocked position, the sleeve 830 may have been rotated clockwise such that a side 865 of the protruded portion 850 abuts an a side wall of a magnet 810. The interaction between the magnet 810 and the protruded portion 850 at inner wall 865 would tend to maintain the chuck 800 in the unlocked position due to the magnetic attraction between the magnet 810 and the protruded portion 850 at 865. Further, to tighten the chuck 800, the sleeve 830 may be turned counterclockwise, as shown in FIG. 8C to overcome the drag created by the magnets 810, such that the magnet 810 now abuts an opposite inner wall 860 of another protruded portion 850 thereby increasing a magnetic attraction between the magnet 810 and the protruded portion 850 of the nut 820.

The sleeve 830, when rotated, may cause the nut 820 to also rotate. However, as the sleeve 830 transition between the locked and unlocked positions, the magnetic force between the magnets 810 and the protruded portions 850 may be overcome and relative movement between the sleeve 830 and the nut 820 may be permitted. In other words, as the sleeve 830 is turned, resistance or drag caused by the magnetic force may be overcome thereby permitting the sleeve 830 to move relative to the nut 820 to move between locked and unlocked positions until the magnet 810 abuts an inner wall of a protruded portion 850. According to some example embodiments, the anti-vibration assembly may comprise a magnet affixed to the sleeve at a sleeve lug, wherein the magnetic force applied to the nut by the magnet maintains the position of the sleeve relative to the nut in the locked position or the unlocked position.

According to some example embodiments, an anti-vibration assembly may leverage mechanical movement associated with a bearing assembly 920 of a chuck. In this regard, similar to above, a bearing assembly may comprise, with reference to, for example FIG. 9B, a bearing ball 922, an inner race 921 operably disposed between the nut 910 and the bearing ball 922, and an outer race 923 operably disposed between the bearing ball 922 and the anti-vibration assembly. According to some example embodiments, when the sleeve 950 is in a locked position, the nut 910 may apply a force on the inner race 921 which transfers to the outer race 923 via the bearing ball 922 and applies a force on the anti-vibration assembly such that the anti-vibration assembly applies at least an increased force on the sleeve 950.

Another example embodiment of an anti-vibration assembly is shown in FIGS. 9A and 9B. In this regard, the anti-vibration assembly may comprise an elastic member 930 and a washer 940. The anti-vibration assembly may interface with the outer race 923 of the bearing assembly that further comprises the bearing ball 922 and the inner race 921. In this regard, as the sleeve 950 rotates in the unlocked position, a compression fit with the elastic member 930 may cause the washer 940 to rotate with the sleeve 950. However, when the chuck 900 is in the locked position, a downward force may be placed on the washer 940 in response to a force exerted on the outer race 923, which prevents further rotation of the washer 940. Similar to the description above, when the chuck 900 transitions into a locked state, the bearing assembly may operate to lock the chuck 900 in position with the tool shank. Further, in the locked position, the nut 910 may apply a downward force on the inner race 922, which translates to the bearing ball 922, and ultimately to the outer race 923. As such, the outer race 923 may apply a downward force on the washer 940 to prevent rotation of the washer 940. The washer 940 may define a cutout portion within which the elastic member 930 maybe placed. As such, since the elastic member 930 (which may be an O-ring) is affixed to the washer 940, the elastic member 930 may engage with the inner wall of the sleeve 950. By doing so, the sleeve 950 may move with the nut 910, but also permit relative movement with the nut 910 when the sleeve 950 is transitioning between locked and unlocked states. The drag created between the elastic member 930 and the sleeve 950 drag may operate to prevent unexpected movement of the sleeve 950 when, for example, the sleeve 950 is in the locked or unlocked position. Additionally, the inclusion of the elastic member 930 may operate to dampen vibration.

With reference to FIG. 9C, according to some example embodiments, an anti-vibration assembly of a chuck 960 may include an elastic member that is a ring 961 (which may be similar in form and substance as ring 620). The ring 961, which may be a type of O-ring, may be formed of an elastic material such as rubber. The ring 961 may be affixed to the bearing assembly 920 (e.g., more specifically the outer race) which rotates with the nut 910 in a number of ways such as via an adhesive or by being compressed between, for example, the outer race and the sleeve 950 or in a circular groove. In this regard, the ring 961 may encircle the bearing assembly 920. The ring 961 may operably couple with an internal surface of a sleeve 950. The sleeve 950 may move with the nut 910, but also permit relative movement with the nut 910 when the sleeve 950 is transitioning between locked and unlocked states. During the movement of the sleeve 950 into the locked position, the ring 961 may provide drag on the movement of the sleeve 950. This drag may operate to prevent unexpected movement of the sleeve 950 when, for example, the sleeve 950 is in the locked or unlocked position. Additionally, the inclusion of the ring 961 may operate to dampen vibration.

With reference to FIG. 9D, additional example embodiments are provided in association with some additional, alternative locations that an elastic ring of an anti-vibration assembly that could be added to the chuck 970. In this regard, similar to the ring 961 described above, rings 971, 972, and 973 may be elastic and operate in a similar fashion as the ring 916, albeit in a different location.

The chuck 970 may include, among other components, the sleeve 950, the nut retainer 951, and a nut 910. One example location for placement of a ring 971 is between the nut 910 and the sleeve. Alternatively, or additionally, another example location for placement of a ring 972 is between the bearing 922 and the sleeve 950. Finally, another example location for placement of a ring 973 is between a washer 975 and the sleeve 950.

Another example embodiment of an anti-vibration assembly is shown in FIGS. 10A through 10C. In this regard, with reference to FIG. 10A, the anti-vibration assembly may comprise flexible disk 1030 that, for example, encircles an interior body of a chuck 1000 and operates in association with the bearing assembly 1020. The flexible disk 1030 may be angled away from the inner wall of the sleeve 1040 such that the flexible disk is non-perpendicular to the inner wall of the sleeve 1040. As such, when the flexible disk 1030 is acted upon by the outer race 1050 an elastic-deformation may take place with the flexible disk 1030 to extend the flexible disk 1030 toward the inner wall of the sleeve 1040 to create drag between the nut 1010 and the sleeve 1040. As shown in FIG. 10B, when the chuck 1000 is not in the unlocked position, the outer race 1050 is not engaged with inner wall of the sleeve 1060. However, as shown in FIG. 10C, when the chuck 1000 is in the locked position, the outer race 1050 may apply at least a downward force on the flexible disk 1030 to deform the disk 1030 so that the flexible disk 1030 engages the sleeve 1060, thereby permitting the flexible disk to absorb vibration caused by operation of a power driver and maintain a position of the sleeve relative to the nut when the sleeve is in the locked position.

Another example embodiment of an anti-vibration assembly is shown in FIGS. 11A and 11B. In this regard, with reference to FIG. 11A, the anti-vibration assembly may comprise an elastic washer 1130 that, for example, encircles an interior body of a chuck 1100 and operates in association with the bearing assembly 1120. According to some example embodiments, the elastic washer 1130 may comprise nylon. The elastic washer 1130 may be disposed largely perpendicular to the inner wall of the sleeve 1140. When the chuck is in the unlocked position, the elastic washer 1130 may rotate with the sleeve 1140. When the chuck 1100 is in the locked position, the elastic washer 1130 may be acted upon by the outer race 1150 in response to forces applied by the nut 1110. A downward force may be applied to the elastic washer 1130 prevent further rotation of the elastic washer 1130, as shown in FIG. 11B, and the elastic washer 1130 may apply a drag further rotation of the sleeve 1140.

Figure 12A:
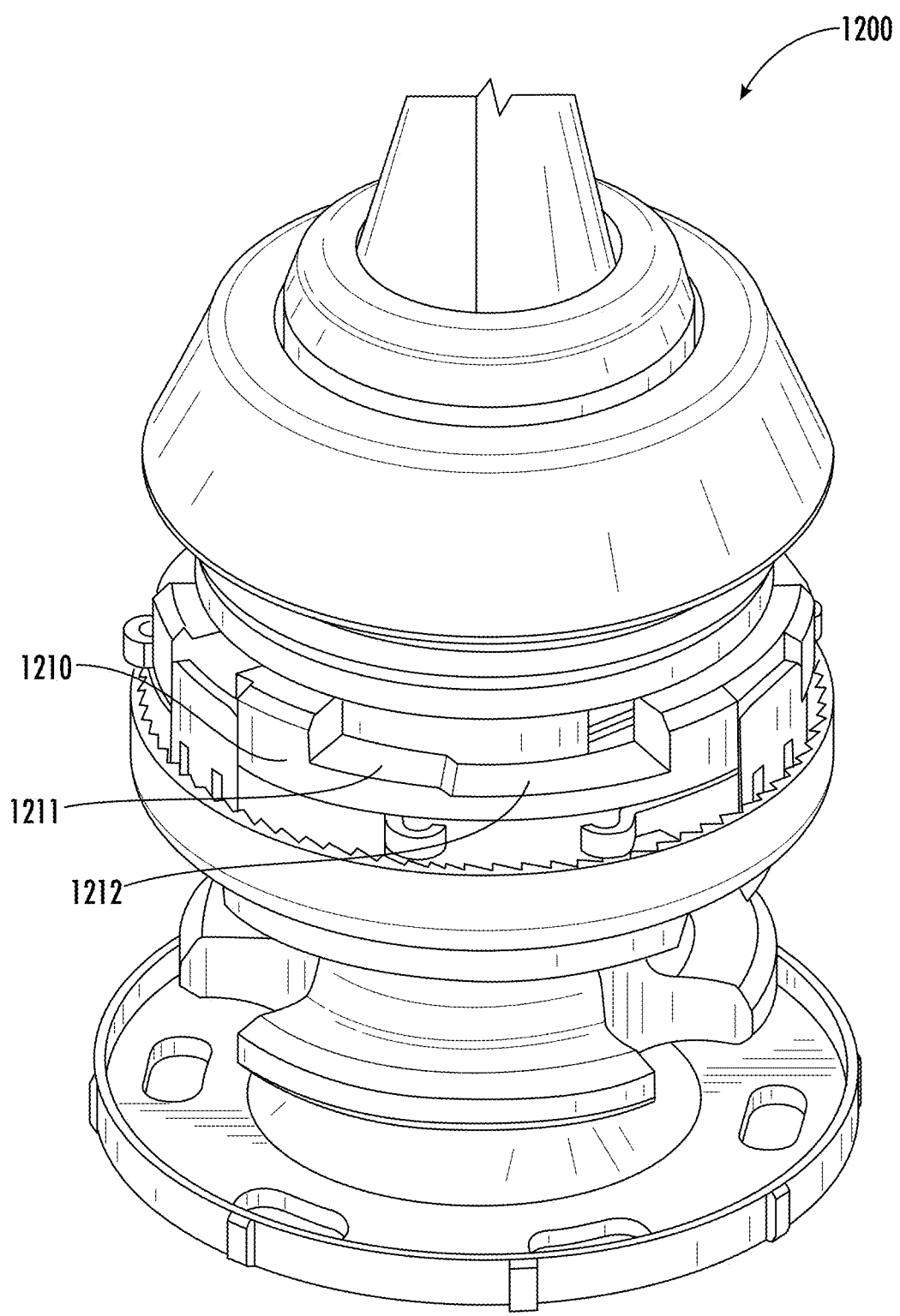
Figure 12B:
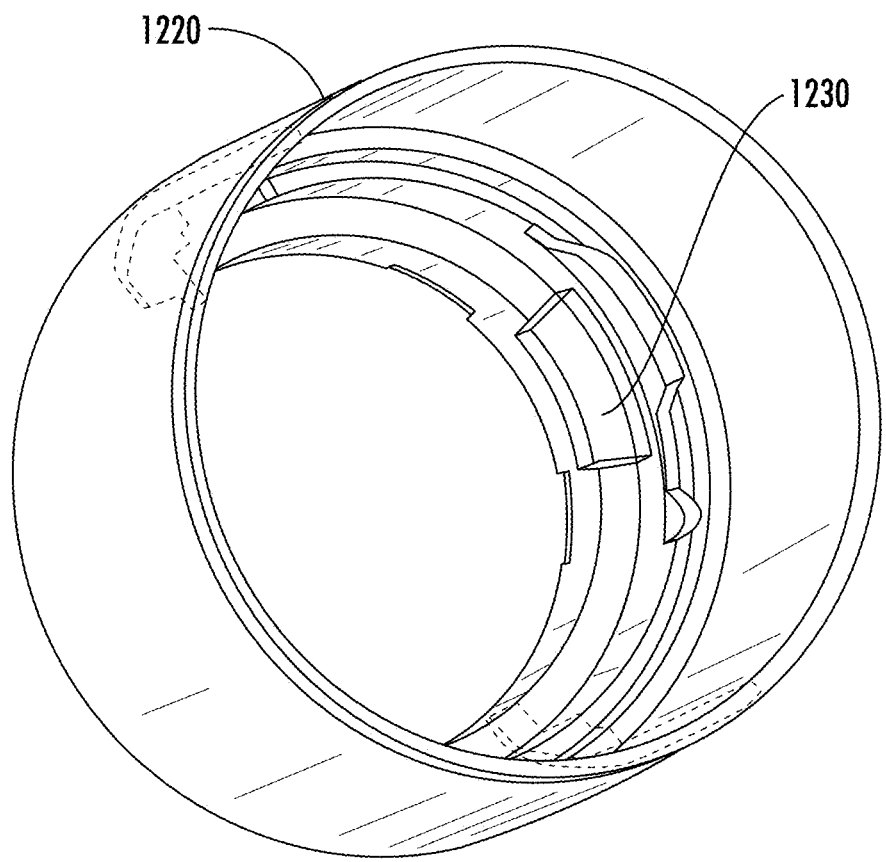
Figure 12C:
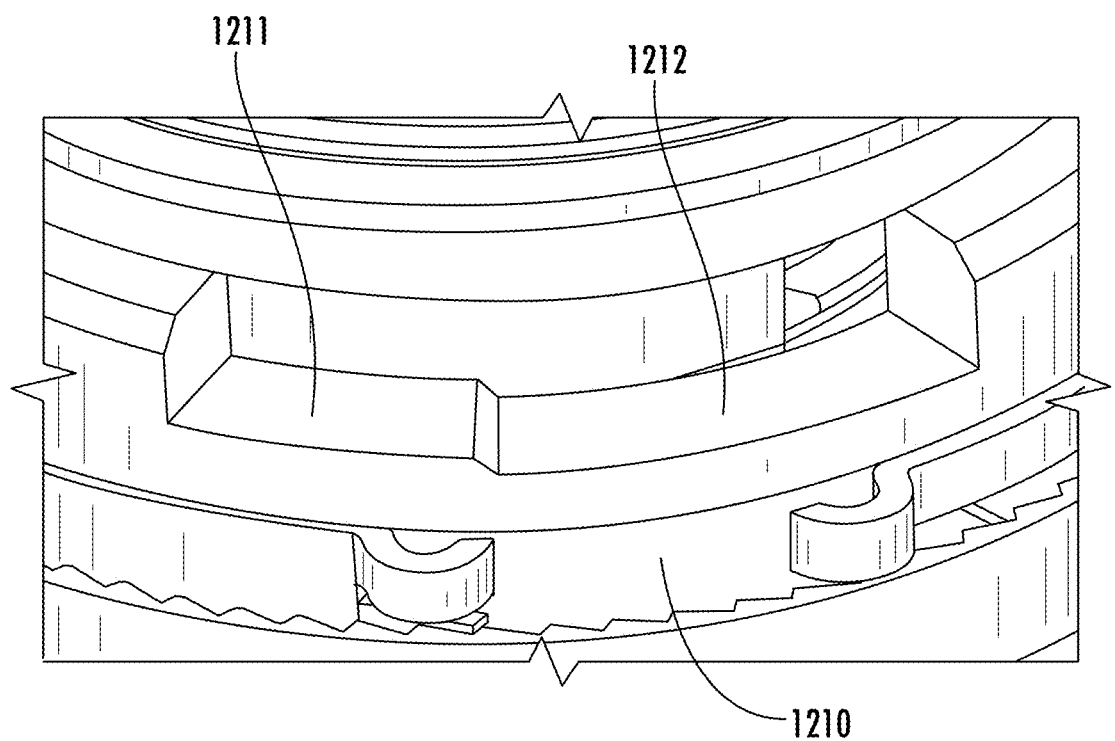
Figure 12D:
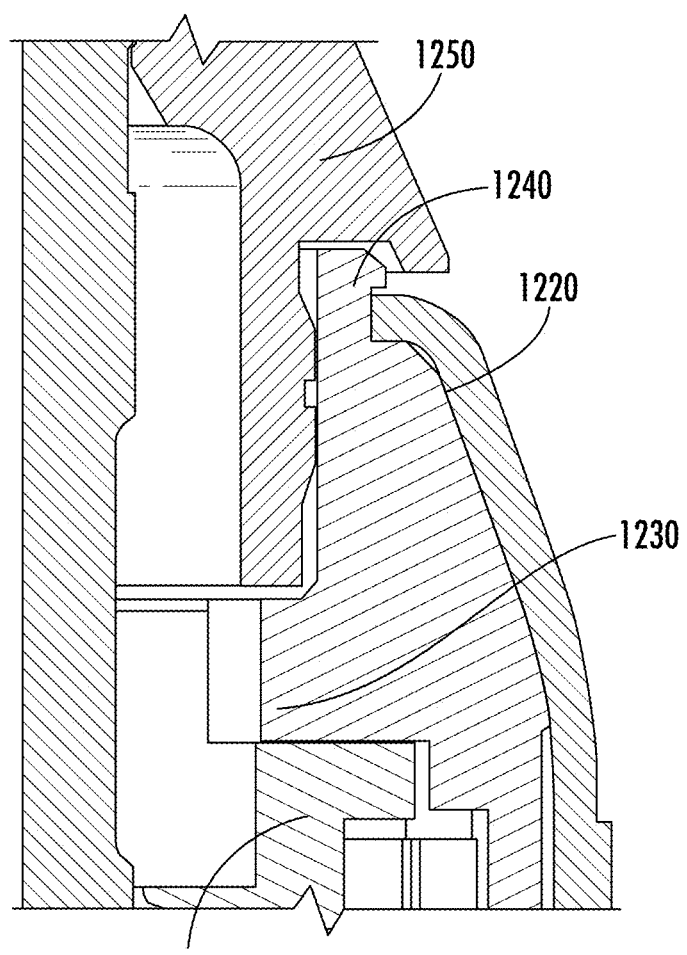

Another example embodiment of an anti-vibration assembly is shown in FIGS. 12A through 12D. In this regard, with reference to FIG. 12A and the chuck 1200, the anti-vibration assembly may comprise an upper step 1211 associated with a locked position and a lower step 1212 associated with an unlocked position disposed on a nut 1210. In this regard, additional detail of the steps is illustrated in FIG. 12C. With reference to FIG. 12B, a sleeve 1220 may include a sleeve lug 1230 that engages with the lower step 1212 and the upper step 1211. Further, with respect to FIG. 12D, the anti-vibration assembly may further include a protrusion 1240 disposed on the sleeve 1220 configured to selectively engage a nose section 1250 of the chuck 1200. According to some example embodiments, the upper surface of the protrusion may include an elastic washer, rubber ring, or wave spring to increase the friction and drag, and also dampen the engagement with the nose section 1250.

In this regard, when the sleeve lug 1230 of the sleeve 1220 is located on the lower step 1212, the protrusion 1240 of the sleeve 1220 may form a clearance between the protrusion 1240 and the nose section 1250. However, when the sleeve 1220 is moved such that such that the sleeve lug 1230 is disposed on the upper step 1211, then the protrusion 1240 is raised to frictionally engage nose section 1250 to absorb vibration caused by operation of the power driver and maintain a position of the sleeve 1220 relative to the nut 1210 when the sleeve 1220.

Many modifications and other embodiments of the chuck set forth herein will come to mind to one skilled in the art to which these inventions pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a powered driver having a rotatable drive shaft, the chuck comprising:
    a body having a nose section and a tail section, the tail section being configured to rotate with the drive shaft and the nose section having an axial bore formed therein and a plurality of passageways formed therethrough and intersecting the axial bore;
    a plurality of jaws movably disposed in the passageways;
    a nut rotatably mounted about the body and operably coupled with the jaws such that rotation of the nut in a closing direction moves the jaws toward an axis of the axial bore and rotation of the nut in an opening direction moves the jaws away from the axis;
    a sleeve rotatably mounted about the body, wherein the sleeve is operably coupled to the nut such that the sleeve selectively rotates the nut, wherein the sleeve is configured to rotate relative to the nut when transitioning between a locked position and an unlocked position;
    an anti-vibration assembly operably disposed between the sleeve and the nut, wherein the anti-vibration assembly is configured to absorb vibration caused by operation of the power driver;
    a bearing ball;
    an inner race operably disposed between the nut and the bearing ball; and
    an outer race operably disposed between the bearing ball and the anti-vibration assembly;
    wherein, when the sleeve is in a locked position, the nut is tightened against the inner race and applies a force on the inner race which transfers to the outer race via the bearing ball and applies a force on the anti-vibration assembly such that the anti-vibration assembly applies at least an increased force on the sleeve.

2. The chuck of claim 1, wherein the anti-vibration assembly comprises a washer and an elastic member, wherein the washer is urged toward the sleeve to compress the elastic member against the sleeve in response to the force exerted on the washer by the outer race.

3. The chuck of claim 1, wherein the anti-vibration assembly is a flexible disk.

4. The chuck of claim 3, wherein the flexible disk is disposed in a non-perpendicular orientation with an inner wall of the sleeve.

5. The chuck of claim 1, wherein the anti-vibration assembly is an elastic washer.

6. A chuck for use with a powered driver having a rotatable drive shaft, the chuck comprising:
    a plurality of moveable jaws;
    a nut operably coupled with the jaws such that rotation of the nut in a closing direction moves the jaws toward an axis of rotation of the nut and rotation of the nut in an opening direction moves the jaws away from the axis;
    a sleeve operably coupled to the nut such that the sleeve selectively rotates the nut, wherein the sleeve is configured to rotate relative to the nut when transitioning between a locked position and an unlocked position; and
    an anti-vibration assembly operably disposed between the sleeve and the nut, wherein the anti-vibration assembly is configured to absorb vibration caused by operation of the power driver;
    wherein the anti-vibration assembly comprises an elastic member affixed to a surface that rotates with the nut and is compressed against the sleeve, and wherein the elastic member comprises at least one pad affixed to a protruded portion of the nut that engages the sleeve, wherein as the sleeve transitions between the locked and unlocked positions the sleeve moves relative to the at least one pad.

7. A chuck for use with a powered driver having a rotatable drive shaft, the chuck comprising:
    a plurality of moveable jaws;
    a nut operably coupled with the jaws such that rotation of the nut in a closing direction moves the jaws toward an axis of rotation of the nut and rotation of the nut in an opening direction moves the jaws away from the axis;
    a sleeve operably coupled to the nut such that the sleeve selectively rotates the nut, wherein the sleeve is configured to rotate relative to the nut when transitioning between a locked position and an unlocked position; and
    an anti-vibration assembly operably disposed between the sleeve and the nut, wherein the anti-vibration assembly is configured to absorb vibration caused by operation of the power driver;

wherein the nut comprises a ferromagnetic material and the anti-vibration assembly comprises a magnet, wherein the magnet is affixed to the sleeve at a sleeve lug, wherein the magnetic force applied to the nut by the magnet maintains the position of the sleeve relative to the nut in the locked position or the unlocked position.

\* \* \* \* \*